(12) United States Patent
Asch et al.

(10) Patent No.: US 7,378,482 B2
(45) Date of Patent: May 27, 2008

(54) COMPOSITIONS HAVING IMPROVED BATH LIFE

(75) Inventors: Karmen Karen Asch, Beaverton, MI (US); Brian Douglas Chapman, Midland, MI (US); Loren Dean Durfee, Midland, MI (US); Robert Michael Hensel, Sanford, MI (US); Timothy Paul Mitchell, Clio, MI (US); James Steven Tonge, Sanford, MI (US); Paul Cornelius Van Dort, Sanford, MI (US); Loretta Ann Jones, Midland, MI (US)

(73) Assignee: Dow Corning Corporation, Midland, MI (US)

( * ) Notice: Subject to any disclaimer, the term of this patent is extended or adjusted under 35 U.S.C. 154(b) by 227 days.

(21) Appl. No.: 10/512,953

(22) PCT Filed: Apr. 29, 2003

(86) PCT No.: PCT/US03/13214

§ 371 (c)(1),
(2), (4) Date: Dec. 12, 2005

(87) PCT Pub. No.: WO03/093369

PCT Pub. Date: Nov. 13, 2003

(65) Prior Publication Data

US 2006/0111491 A1    May 25, 2006

Related U.S. Application Data

(60) Provisional application No. 60/377,505, filed on May 1, 2002.

(51) Int. Cl.
   *C08G 77/12* (2006.01)
(52) U.S. Cl. .......................... 528/31; 528/33
(58) Field of Classification Search ............ 528/31, 528/15
   See application file for complete search history.

(56) References Cited

U.S. PATENT DOCUMENTS

| | | | |
|---|---|---|---|
| 2,868,766 A | 1/1959 | Johannson | |
| 2,994,684 A | 8/1961 | Johannson | |
| 3,002,951 A | 10/1961 | Johannson | |
| 3,159,601 A | 12/1964 | Ashby | 260/46.5 |
| 3,159,662 A | 12/1964 | Ashby | 260/448.2 |
| 3,220,972 A | 11/1965 | Lamoreaux | 260/46.5 |
| 3,296,291 A | 1/1967 | Chalk et al. | 260/448.2 |
| 3,372,178 A | 3/1968 | Wu | 260/448.2 |
| 3,410,886 A | 11/1968 | Joy | 260/448.2 |
| 3,419,593 A | 12/1968 | Willing | 260/448.2 |
| 3,516,946 A | 6/1970 | Modic | 252/429 |
| 3,814,730 A | 6/1974 | Karstedt | 260/46.5 |
| 3,928,629 A | 12/1975 | Chandra et al. | 427/387 |
| 3,989,668 A | 11/1976 | Lee et al. | 260/46.5 |
| 3,996,195 A | 12/1976 | Sato et al. | |
| 4,245,079 A | 1/1981 | Matsumoto et al. | |
| 4,427,801 A | 1/1984 | Sweet | |
| 4,461,867 A | 7/1984 | Surprenant | 524/788 |
| 4,525,400 A | 6/1985 | Surprenant | 428/54 |
| 4,525,566 A | 6/1985 | Homan et al. | 528/17 |
| 4,616,076 A | 10/1986 | Ona et al. | 528/15 |
| 4,681,963 A | 7/1987 | Lewis | 556/453 |
| 4,705,765 A | 11/1987 | Lewis | 502/152 |
| 4,726,964 A | 2/1988 | Isobe et al. | 427/54.1 |
| 4,849,491 A | 7/1989 | Ogawa et al. | 528/15 |
| 4,900,779 A | 2/1990 | Leibfried | |
| 4,902,731 A | 2/1990 | Leibfried | |
| 5,036,117 A | 7/1991 | Chung et al. | 522/172 |
| 5,097,054 A | 3/1992 | Yamamoto et al. | 556/451 |
| 5,162,445 A | 11/1992 | Powers et al. | 525/333.4 |
| 5,175,325 A | 12/1992 | Brown et al. | 556/9 |
| 5,200,543 A * | 4/1993 | Inomata et al. | 556/434 |
| 5,290,841 A | 3/1994 | Enami et al. | |
| 5,344,906 A | 9/1994 | Westall | |
| 5,378,790 A | 1/1995 | Michalczyk et al. | 528/35 |
| 5,412,055 A | 5/1995 | Loo | 528/15 |
| 5,426,167 A | 6/1995 | Powers et al. | 526/347 |
| 5,436,308 A | 7/1995 | Durfee et al. | |
| 5,525,696 A | 6/1996 | Herzig et al. | 528/15 |
| 5,536,803 A * | 7/1996 | Fujiki et al. | 528/15 |
| 5,545,831 A | 8/1996 | Kaiya et al. | 524/731 |
| 5,545,837 A | 8/1996 | Kobayashi | 556/460 |
| 5,548,051 A | 8/1996 | Michalczyk et al. | 528/15 |

(Continued)

FOREIGN PATENT DOCUMENTS

EP    0 464 706    1/1992

(Continued)

OTHER PUBLICATIONS

Kurian et al., Novel Cyclosiloxane-Based Networks, Polymer Preprints 2003, 44(1)m 33-34.

(Continued)

*Primary Examiner*—Mark Eashoo
*Assistant Examiner*—Robert Loewe
(74) *Attorney, Agent, or Firm*—Patricia M. Scaduto; Sharon K. Brady

(57) ABSTRACT

A composition comprising (A) at least one compound having at least one aliphatic unsaturation; (B) at least one organohydrogensilicon compound containing at least one silicon-bonded hydrogen atom per molecule and (C) a platinum group metal-containing catalyst.

23 Claims, No Drawings

U.S. PATENT DOCUMENTS

| | | | | |
|---|---|---|---|---|
| 5,575,831 | A | 11/1996 | Yamamura et al. | 75/614 |
| 5,581,008 | A | 12/1996 | Kobayashi | 556/434 |
| 5,656,711 | A | 8/1997 | Fukuda et al. | |
| 5,670,596 | A | 9/1997 | Razzano et al. | |
| 5,691,435 | A | 11/1997 | Herzig et al. | 528/15 |
| 5,830,969 | A | 11/1998 | Ahmed Jallouli et al. | |
| 5,883,215 | A | 3/1999 | Bischoff et al. | |
| 5,985,462 | A | 11/1999 | Herzig et al. | 428/447 |
| 6,093,782 | A | 7/2000 | Herzig et al. | 528/15 |
| 6,127,502 | A | 10/2000 | Krahnke et al. | 528/10 |
| 6,160,150 | A | 12/2000 | Krahnke et al. | 556/451 |
| 6,177,519 | B1 | 1/2001 | Chung et al. | 525/263 |
| 6,184,407 | B1 | 2/2001 | Yoshitake et al. | 556/434 |
| 6,235,832 | B1 | 5/2001 | Deng et al. | 524/525 |
| 6,252,100 | B1 | 6/2001 | Herzig | 556/450 |
| 6,300,452 | B1 | 10/2001 | Jukarainen et al. | 528/15 |
| 6,303,729 | B1 | 10/2001 | Sato | 528/25 |
| 6,313,255 | B1 | 11/2001 | Rubinsztajn | 528/27 |
| 6,353,075 | B1 | 3/2002 | Hupfield et al. | |
| 6,528,584 | B2 | 3/2003 | Kennedy et al. | 525/101 |
| 6,605,734 | B2 | 8/2003 | Roy et al. | 556/9 |
| 2002/0099114 | A1* | 7/2002 | Nakayoshi et al. | 523/209 |
| 2003/0022991 | A1 | 1/2003 | Kennedy et al. | 525/100 |
| 2006/0074212 | A1 | 4/2006 | Chapman et al. | |
| 2006/0116500 | A1 | 6/2006 | Chapman et al. | |

FOREIGN PATENT DOCUMENTS

| | | |
|---|---|---|
| EP | 0 259 711 | 3/1994 |
| EP | 0259711 | 3/1994 |
| EP | 0 416 471 | 1/1999 |
| EP | 0 600 512 | 2/2000 |
| EP | 0 979 837 | 2/2000 |
| EP | 0600512 | 2/2000 |

OTHER PUBLICATIONS

Kurian et al., Novel Tricomponent Membranes Containing Poly(Ethylene Glycol)/Poly(Pentamethylcyclopentasiloxane)/pOLY(Dimethylsiloxane) Domains, Journal of Polymer Science: Part A: Polymer Chemistry, vol. 40, 3093-3102 (2002).

Kurian et al., Synthesis and Characterization of Novel Amphiphilic Block Copolymers Di-, Tri-, Multi-, and Star Blocks of PEG and PIB, Journal of Polymer Science: Part A: Polymer Chemistry, vol. 38, 3200-3209 (2000).

Kurian et al., Novel Tricontinuous Hydrophilic-Lipophilic-Oxyphilic Membranes: Synthesis and Characterization, Journal of Polymer Science: Part A: Polymer Chemistry, vol. 40, 1209-1217 (2002).

Koyava N. A., et al.: Synthesis of Organocyclosiloxanes with a Predetermined Arrangement of Functional Groups on the Silicon Atoms, Journal of General Chemistry of the USSR, vol. 50, No. 8, 1980, pp. 1461-1465.

Andrianov, K. A. et al.: Heterofunctional Condensation of Chlorosilanes with Tetra- and Hexaphenylsiloxanediols, Chemistry of Heterocyclic Compounds, vol. 8, 1972, pp. 810-812.

Andrianov, K. A., et al.: Substitution Reactions in Organocyclosiloxanes Containing Functional Groups Attached to the Silicon Atom, Chemistry of Heterocyclic Compounds, vol. 8, 1972, pp. 1068-1070.

Backer, M., et al.: Si Chemical Shift Tensors of Silyl Silicate Cages, Solid State Nuclear Magnetic Resonance, Netherlands, vol. 9, No. 2-4, Dec. 1997, pp. 241-255.

Sakiyama, M., et al.: The Selective Halogenation of Methylhydropolysiloxanes: Syntheses of Methylhalopolysiloxanes and Their Derivatives, Bulletin of the Chemical Society of Japan, vol. 38, No. 12, 1965, pp. 2182-2186.

Sokolov, N. N., et al.: Organocyclosiloxanes I. Methylchlorocyclsosiloxanes, Journal of General Chemistry of the USSR, vol. 26, 1956, pp. 1061-1063.

Sokolov, N. N., et al.: Organocyclosiloxanes II. Methylchlorocyclsosiloxanes, Journal of General Chemistry of the USSR, vol. 26, 1956, pp. 2545-2547.

* cited by examiner

COMPOSITIONS HAVING IMPROVED BATH LIFE

CROSS REFERENCES TO RELATED APPLICATIONS

The present application is a US national stage filing under 35 USC 371 and claims priority from PCT application No. PCT/USS03/13214 filed on Apr. 29, 2003 and U.S. application No. 60/377,505 filed on May 1, 2002. The above applications are incorporated by reference in their entirety.

This invention relates to a composition comprising (A) at least one compound having at least one aliphatic unsaturation; (B) at least one organohydrogensilicon compound containing at least one silicon-bonded hydrogen atom per molecule and (C) a platinum group metal-containing catalyst.

Silicon-based compositions which cure by hydrosilylation are useful in a wide variety of applications to produce coatings, elastomers, adhesives, foams or fluids. In the silicone release coating area, silicone compositions are useful in applications where relatively non-adhesive surfaces are required. Single sided liners, for example, backing papers for pressure sensitive adhesive labels, are usually adapted to temporarily retain the labels without affecting the adhesive properties of the labels. Double sided liners for example, interleaving papers for double sided and transfer tapes, are utilized to ensure the protection and desired unwind characteristics of a double sided self-adhesive tape or adhesive film. A substrate, for example a single sided liner, is coated by applying a silicon-based release coating composition onto the substrate and subsequently curing the composition, by, for example, thermally initiated hydrosilylation.

The basic constituents of silicon-based compositions which cure by hydrosilylation are an alkenylated polydiorganosiloxane, typically a linear polymer with terminal alkenyl groups; a polyorganohydrogensiloxane cross-linking agent designed to cross-link the alkenylated polydiorganosiloxane; and a catalyst, to catalyze the aforementioned cross-linking reaction. Often a fourth constituent, an inhibitor designed to prevent the commencement of curing below a prerequisite cure temperature, is also included in the composition.

Silicon-based release coating compositions having the three essential constituents and optionally the inhibitor are generally referred to as premium release coating compositions. In order to control the level of release force from a release coating it has become common practice for a silicon-based release coating composition to contain an additive, generally known as a release modifier. The release modifier usually replaces a proportion of the alkenylated polydiorganosiloxane in a premium release coating composition.

Improvements in the performance of compositions which cure by hydrosilylation are continuously being sought with respect to, for example, ease of cure, i.e. the decrease in cure times at relatively low temperatures, extended working time of a formulated bath, i.e. longer thin film and bulk bath life, anchorage of coatings to a substrate, and particularly for high catalyst coatings such as release coatings, maintenance of excellent performance in the aforementioned areas with decreased catalyst level and therefore decreased cost.

One object of the present invention is to describe compositions with improved bath life while maintaining excellent cure and anchorage properties. Another object is to describe compositions that have the above-described properties even at reduced catalyst levels.

The present invention relates to a composition comprising (A) at least one compound having at least one aliphatic unsaturation; (B) at least one organohydrogensilicon compound containing at least one silicon-bonded hydrogen atom per molecule and (C) a platinum group metal-containing catalyst.

The present invention relates to a composition comprising (A) at least one compound having at least one aliphatic unsaturation; (B) at least one organohydrogensilicon compound containing at least one silicon-bonded hydrogen atom per molecule described by formula (III)

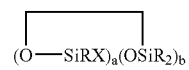

$(O-SiRX)_a(OSiR_2)_b$ where each R is independently selected from a hydrogen atom and a monovalent hydrocarbon group comprising 1 to 20 carbon atoms which is free from aliphatic unsaturation, a is an integer from 1 to 18, b is an integer from 1 to 19, a+b is an integer from 3 to 20, each X is an independently selected functional group selected from a halogen atom, an ether group, an alkoxy group, an alkoxyether group, an acyl group, an epoxy group, an amino group, or a silyl group, or a -Z-R$^4$ group, where each Z is independently selected from an oxygen and a divalent hydrocarbon group comprising 2 to 20 carbon atoms, each R$^4$ group is independently selected from $-BR_uY_{2-u}$, $-SiR_vY_{3-v}$, or a group described by formula (IV):

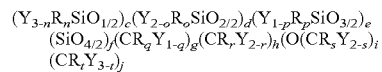

$(Y_{3-n}R_nSiO_{1/2})_c(Y_{2-o}R_oSiO_{2/2})_d(Y_{1-p}R_pSiO_{3/2})_e$
$(SiO_{4/2})_f(CR_qY_{1-q})_g(CR_rY_{2-r})_h(O(CR_sY_{2-s})_i$
$(CR_tY_{3-t})_j$ where B refers to boron, each R is as described above, the sum of c+d+e+f+g+h+i+j is at least 2, n is an integer from 0 to 3, o is an integer from 0 to 2, p is an integer from 0 to 1, q is an integer from 0 to 1, r is an integer from 0 to 2, s is an integer from 0 to 2, t is an integer from 0 to 3, u is an integer from 0 to 2, v is an integer from 0 to 3, each Y is an independently selected functional group selected from a halogen atom, an ether group, an alkoxy group, an alkoxyether group, an acyl group, an epoxy group, an amino group, or a silyl group, or a Z-G group, where Z is as described above, each G is a cyclosiloxane described by formula (V):

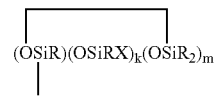

$(OSiR)(OSiRX)_k(OSiR_2)_m$ where R and X are as described above, k is an integer from 0 to 18, m is an integer from 0 to 18, k+m is an integer from 2 to 20, provided in formula (IV) that one of the Y groups is replaced by the Z group bonding the R$^4$ group to the cyclosiloxane of formula (III), and provided further if g+h+i+j>0 then c+d+e+f>0; and (C) a platinum group metal-containing catalyst.

Another embodiment of the present invention is a composition comprising (A) at least one compound having at least one aliphatic unsaturation; (B) at least one organohydrogensilicon compound containing at least one silicon-bonded hydrogen atom per molecule described by formula (III)

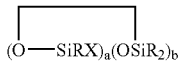

where each R is independently selected from a hydrogen atom and a monovalent hydrocarbon group comprising 1 to 20 carbon atoms which is free from aliphatic unsaturation, a is an integer from 1 to 18, b is an integer from 2 to 19, a+b is an integer from 3 to 20, each X is an independently selected functional group selected from a halogen atom, an ether group, an alkoxy group, an alkoxyether group, an acyl group, an epoxy group, an amino group, or a silyl group, or a -Z-$R^4$ group, where each Z is independently selected from an oxygen and a divalent hydrocarbon group comprising 2 to 20 carbon atoms, each $R^4$ group is independently selected from —$BR_uY_{2-u}$, —$SiR_vY_{3-v}$, or a group described by formula (IV):

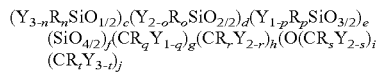

where B refers to boron, each R is as described above, the sum of c+d+e+f+g+h+i+j is at least 2, n is an integer from 0 to 3, o is an integer from 0 to 2, p is an integer from 0 to 1, q is an integer from 0 to 1, r is an integer from 0 to 2, s is an integer from 0 to 2, t is an integer from 0 to 3, u is an integer from 0 to 2, v is an integer from 0 to 3, each Y is an independently selected functional group selected from a halogen atom, an ether group, an alkoxy group, an alkoxyether group, an acyl group, an epoxy group, an amino group, or a silyl group, or a Z-G group, where Z is as described above, each G is a cyclosiloxane described by formula (V):

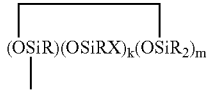

where R and X are as described above, k is an integer from 0 to 18, m is an integer from 0 to 18, k+m is an integer from 2 to 20, provided in formula (IV) that one of the Y groups is replaced by the Z group bonding the $R^4$ group to the cyclosiloxane of formula (III), and provided further if g+h+i+j>0 then c+d+e+f>0; and (C) a platinum group metal-containing catalyst.

As used herein, the term "aliphatic unsaturation" refers to a carbon-carbon multiple bond. Further as used herein, the term "compound", unless indicated otherwise, is a chemical substance which has a particular molecular identity or is made of a mixture of such substances, e.g., polymeric substances. The term "hydrosilylation" means the addition of organosilicon compounds containing silicon-bonded hydrogen to a compound containing an aliphatic unsaturation, and in the hydrosilylation process described in this application, it refers to those processes in which platinum group-containing catalysts are used to effect the addition of an organosilicon compound having a silicon-bonded hydrogen atom to an aliphatically unsaturated compound having either olefinic or acetylenic unsaturation.

Component (A) comprises at least one compound having at least one aliphatic unsaturation. The compounds of Component (A) can be linear, branched, resinous or cyclic and can be monomers or polymers (including copolymers, terpolymers etc.) provided there is at least one aliphatic unsaturation. Compounds containing aliphatic unsaturation which are useful in the present invention have alkenyl (also described as olefinic) unsaturation or alkynyl (also described as acetylenic) unsaturation. These compounds are well-known in the art of hydrosilylation and are disclosed in such patents as U.S. Pat. No. 3,159,662 (Ashby), U.S. Pat. No. 3,220,972 (Lamoreaux)), and U.S. Pat. No. 3,410,886 (Joy), which disclosures of said compounds are incorporated herein by reference. In instances where these unsaturated compounds contain elements other than carbon and hydrogen, it is preferred that these elements be oxygen, nitrogen, silicon, a halogen, or a combination thereof.

The aliphatically unsaturated compound of component (A) can contain one or more carbon-to-carbon multiple bonds. Representative examples of the aliphatically unsaturated hydrocarbons which can be employed include mono-olefins, for example, ethene (ethylene), propene, and 1-pentene, diolefins, for example, divinylbenzene, butadiene, 1,5-hexadiene and 1-buten-3-yne, cycloolefins, for example, cyclohexene and cycloheptene, and monoalkynes, for example, acetylene, propyne and 1-hexyne.

Oxygen-containing aliphatically unsaturated compounds can also be used for component (A), especially where the unsaturation is ethylenic, such as vinylcyclohexyl epoxide, allyl glycidyl ether, methylvinyl ether, divinylether, phenylvinyl ether, monoallyl ether of ethylene glycol, allyl aldehyde, methylvinyl ketone, phenylvinyl ketone, acrylic acid, methacrylic acid, methyl acrylate, allyl acrylate, methyl methacrylate, allyl methacrylate, vinylacetic acid, vinyl acetate, and linolenic acid.

Heterocyclic compounds containing aliphatic unsaturation in the ring, such as dihydrofuran, and dihydropyran, are also suitable as component (A) for the present invention.

Halogenated derivatives of the previously mentioned aliphatically unsaturated compounds can be employed as component (A), including acyl chlorides as well as compounds containing a halogen substituent on a carbon atom other than a carbonyl carbon atom. Such halogen-containing compounds include, for example, vinyl chloride, and the vinyl-chlorophenyl esters.

Unsaturated compounds containing nitrogen substituents such as acrylonitrile, N-vinylpyrrolidone, alkyl cyanide, nitroethylene, etc., are also useful in the practice of the present invention.

Other compounds useful as component (A) in the practice of the present invention include polymers (including copolymers, terpolymers etc.) of the various compounds described above provided there is at least one aliphatic unsaturation. Examples include polymers derived from olefinic monomers having 2 to 20 carbon atoms and dienes having 4 to 20 carbon atoms; polymers of monoolefin, isomonoolefin and vinyl aromatic monomers, such as monoolefins having 2 to 20 carbon groups, isomonoolefins having 4 to 20 carbon groups, and vinyl aromatic monomers including styrene, para-alkylstyrene, para-methylstyrene. The compounds can also be poly(dienes) and derivatives. Most polymers derived from dienes usually contain unsaturated ethylenic units on backbone or side-chains. Representative examples include polybutadiene, polyisoprene, polybutenylene, poly(alkyl-butenylene) where alkyl includes alkyl groups having 1 to 20 carbon atoms, poly(phenyl-butenylene), polypentenylene, natural rubber (a form of polyisoprene); and butyl rubber (copolymer of isobutylene and isoprene).

The compounds of component (A) can also be a halogenated olefin polymer having aliphatic unsaturation. Representative examples of a halogenated olefin polymer having aliphatic unsaturation include polymers resulting from the bromination of a copolymer of isomonoolefin with paramethylstyrene to introduce benzylic halogen (as described in U.S. Pat. No. 5,162,445), halogenated polybutadienes, halogenated polyisobutylene, poly(2-chloro-1,3-butadiene), polychloroprene (85% trans), poly(1-chloro-1-butenylene) (Neoprene™), and chlorosulfonated polyethylene.

The compound of component (A) having aliphatic unsaturation can also include polymers containing other compounds described above such as vinyl ether groups, acrylate groups, methyacrylate groups, and epoxy-functional groups.

A particularly useful type of compound which can be employed as component (A) in the present invention is that containing silicon, such as those compounds commonly referred to as organosilicon compounds and silicon modified organic compounds. The useful organosilicon compounds have at least one aliphatically unsaturated group attached to silicon per molecule. The aliphatically unsaturated organosilicon compounds include silanes, polysilanes, siloxanes, silazanes, as well as monomeric or polymeric materials containing silicon atoms joined together by hydrocarbyl groups such as alkylene or polyalkylene groups or arylene groups. The silicon-modified organic compounds useful in the present invention include organic monomers or polymers such as described above having at least one silicon atom attached as a silane or a siloxane segment. The silicon-containing units can contain aliphatic unsaturation and can be attached at the terminal and/or pendant positions on the organic polymer chain or as a copolymer.

Silanes useful in the present invention can be described by formula (I)

$$Q_{4-n}R^1{}_nSi,$$

where each $R^1$ is an independently selected monovalent hydrocarbon radical comprising 1 to 20 carbon atoms free from aliphatic unsaturation, each Q is independently selected from a monovalent hydrocarbon group comprising 2 to 20 carbon atoms having at least one aliphatic unsaturation, a monovalent oxyhydrocarbon group comprising 2 to 20 carbon atoms having at least one aliphatic unsaturation, a halogen atom, an alkoxy group, or an acyl group, provided at least one Q group has at least one aliphatic unsaturation.

Examples of silanes include vinyltrimethoxysilane, vinyltriethoxysilane, vinyltrimethylsilane, vinyldimethylchlorosilane, vinylmethyldichlorosilane, divinyldimethylsilane, diallyldimethylsilane, hexenyldimethylchlorosilane, and hexenylmethyldichlorosilane, and vinyltriacetoxysilane.

Examples of silane-modified organic polymers are silylated polymers derived from olefins, isomonoolefin, dienes, ethylene or propylene oxides, and vinyl aromatic monomers having 2 to 20 carbon atoms such as the silane-grafted copolymers of isomonoolefin and vinyl aromatic monomer as discussed in U.S. Pat. Nos. 6,177,519 and 5,426,167. Other representative silicon-modified organic polymers are illustrated by, but not limited to alkenylsiloxy-functional polymers such as vinylsiloxy-, allylsiloxy-, and hexenylsiloxy-organic polymers and siloxane-organic block copolymers.

Preferred organosilicon polymers and silicon-modified organic polymers can be described by formula (II):

$$(Q_{3-n}R^1{}_nSiO_{1/2})_{c'}(Q_{2-o}R^1{}_oSiO_{2/2})_{d'}(Q_{1-p}R^1{}_{p'}SiO_{3/2})_{e'}(SiO_{4/2})_{f'}(CR^2{}_qQ_{1-q'})_{g'}(CR^2{}_rQ_{2-r'})_{h'}(OCR^2{}_sQ_{2-s'})_{i'}(CR^2{}_tQ_{3-t'})_{j'},$$

where each $R^1$ and Q group is as described above, each $R^2$ is an independently selected hydrogen atom or monovalent hydrocarbon group comprising 1 to 20 carbon atoms which are free from aliphatic unsaturation, the sum of c'+d'+e'+f'+g'+h'+i'+j' is at least 2, n' is an integer from 0 to 3, o' is an integer from 0 to 2, p' is an integer from 0 to 1, q' is an integer from 0 to 1, r' is an integer from 0 to 2, s' is an integer from 0 to 2, t' is an integer from 0 to 3, provided if g'+h'+i'+j'>0 then c'+d'+e'+f'>0.

In formulas (I) and (II), each $R^1$ group is an independently selected monovalent hydrocarbon group comprising 1 to 20 carbon atoms which are free from aliphatic unsaturation. Each $R^1$ group can be linear, branched or cyclic. $R^1$ can be unsubstituted or substituted with halogen atoms. The monovalent hydrocarbon group of $R^1$ can be exemplified by alkyl groups such as methyl, ethyl, propyl, butyl, hexyl, octyl, 3,3,3-trifluoropropyl, chloromethyl, and decyl, cycloaliphatic groups such as cyclohexyl, aryl groups such as phenyl, tolyl, and xylyl, chorophenyl, and aralkyl groups such as benzyl, styryl and alpha-methylstyryl. It is preferred that each $R^1$ group is an independently selected alkyl group comprising 1 to 8 carbon atoms or aryl group comprising 6 to 9 carbon atoms. It is most preferred that each $R^1$ group is independently selected from methyl, alpha-methylstyryl, 3,3,3-trifluoropropyl and nonafluorobutylethyl. Each $R^1$ can be identical or different, as desired.

In formula (II), each $R^2$ group is an independently selected hydrogen atom or monovalent hydrocarbon group comprising 1 to 20 carbon atoms free from aliphatic unsaturation. Each monovalent hydrocarbon groups of $R^2$ can be linear, branched or cyclic. Each monovalent hydrocarbon group of $R^2$ can be unsubstituted or substituted with halogen atoms. The monovalent hydrocarbon groups of $R^2$ are exemplified as described above for the monovalent hydrocarbon groups of $R^1$. It is preferred that each $R^2$ group is an independently selected hydrogen atom, alkyl group comprising 1 to 8 carbon atoms, or aryl group comprising 6 to 9 carbon atoms. It is most preferred that each $R^2$ is hydrogen. Each $R^2$ can be identical or different, as desired.

In formulas (I) and (II), each Q is independently selected from a monovalent hydrocarbon group comprising 2 to 20 carbon atoms having at least one aliphatic unsaturation, a monovalent oxyhydrocarbon group comprising 2 to 20 carbon atoms having at least one aliphatic unsaturation, a halogen atom, an alkoxy group, or an acyl group, provided at least one Q group has at least one aliphatic unsaturation.

The aliphatic unsaturations of Q can be found in a pendant position to the hydrocarbon chain, at the end of the hydrocarbon chain, or both, with the terminal position being preferred. Each monovalent hydrocarbon and oxyhydrocarbon group can be linear, branched, or cyclic.

Examples of monovalent hydrocarbon groups comprising 2 to 20 carbon atoms having at least one aliphatic unsaturation of Q include alkenyl groups such as vinyl, allyl, 3-butenyl, 4-pentenyl, 5-hexenyl, cyclohexenyl, 6-heptenyl, 7-octenyl, 8-nonenyl, 9-decenyl, 10-undecenyl, and diene groups comprising 4 to 20 carbon atoms such as 4,7-octadienyl, 5,8-nonadienyl, 5,9-decadienyl, 6,11-dodecadienyl, 4,8-nonadienyl, and 7,13-tetradecadienyl.

Examples of monovalent oxyhydrocarbon groups comprising 2 to 20 carbon atoms having at least one aliphatic unsaturation of Q include alkenyloxy groups such as oxybutylvinylether and alkynyloxy groups such as propargyloxy or hexynyloxy.

Examples of halogen atoms of Q include chloro, fluoro, and bromo atoms. Examples of alkoxy groups of Q include methoxy, ethoxy, and isopropoxy. An example of an acyl group of Q is acetoxy.

Preferably, each Q is an independently selected monovalent hydrocarbon group comprising 2 to 20 carbon atoms having at least one aliphatic unsaturation. More preferably, each Q is an independently selected alkenyl group comprising 2 to 20 carbon atoms, with an alkenyl group comprising 2 to 8 carbon atoms being most preferred for Q.

In formula (II), the sum of $c'+d'+e'+f'+g'+h'+i'+j'$ is at least 2, preferably from 2 to 5300, more preferably from 2 to 1000. Preferably, subscript c' is an integer from 0 to 50, with 2 to 20 being more preferred, and 2 to 10 being most preferred. Preferably, subscript d' is an integer from 0 to 5000, with 0 to 500 being more preferred, and 1 to 300 being most preferred. Preferably, subscript e' is an integer from 0 to 48, with 0 to 30 being more preferred, and 0 to 15 being most preferred. Preferably, subscript f' is an integer from 0 to 24, with 0 to 10 being more preferred, and 0 to 6 being most preferred. Preferably, subscript g' is an integer from 0 to 50, with 0 to 20 being more preferred, and 0 to 10 being most preferred. Preferably, subscript h' is an integer from 0 to 150, with 0 to 80 being more preferred, and 0 to 60 being most preferred. Preferably, subscript i' is an integer from 0 to 50, with 0 to 20 being more preferred, and 0 to 10 being most preferred. Preferably, subscript j' is an integer from 0 to 50, with 0 to 15 being more preferred, and 0 to 10 being most preferred.

In formula (II), n' is an integer from 0 to 3, preferably from 2 to 3; o' is an integer from 0 to 2, preferably from 1 to 2; p' is an integer from 0 to 1, preferably 1; q' is an integer from 0 to 1, preferably 1; r' is an integer from 0 to 2, preferably from 1 to 2; s' is an integer from 0 to 2, preferably from 1 to 2; and t' is an integer from 0 to 3, preferably from 2 to 3.

Examples of organosilicon polymers and silicon-modified organic polymers described by formula (II) include trimethylsiloxy-terminated polydimethylsiloxane-polymethylvinylsiloxane copolymers, vinyldimethylsiloxy-terminated polydimethylsiloxane-polymethylvinylsiloxane copolymers, trimethylsiloxy-terminated polydimethylsiloxane-polymethylhexenylsiloxane copolymers, hexenyldimethylsiloxy-terminated polydimethylsiloxane-polymethylhexenylsiloxane copolymers, vinyldimethylsiloxy-terminated polydimethylsiloxane-polymethyhexenylsiloxane copolymers, trimethylsiloxy-terminated polymethylvinylsiloxane polymers, trimethylsiloxy-terminated polymethylhexenylsiloxane polymers, vinyldimethylsiloxy-terminated polydimethylsiloxane polymers, and hexenyldimethylsiloxy-terminated polydimethylsiloxane polymers, vinyldimethylsiloxy terminated poly(dimethylsiloxane-monomethylsilsesquioxane) polymers, vinyldimethylsiloxy terminated poly(dimethylsiloxane-vinylmethylsiloxane-methylsilsesquioxane) copolymers; trimethylsiloxy terminated poly(dimethylsiloxane-vinylmethylsiloxane-methylsilsesquioxane) polymers, hexenyldimethylsiloxy terminated poly(dimethylsiloxane-monomethylsilsesquioxane) polymers, hexenyldimethylsiloxy terminated poly(dimethylsiloxane-hexenylmethylsiloxane-methylsilsesquioxane) copolymers; trimethylsiloxy terminated poly(dimethylsiloxane-hexenylmethylsiloxane-methylsilsesquioxane) polymers, vinyldimethylsiloxy terminated poly(dimethylsiloxane-silicate) copolymers, hexenyldimethylsiloxy-terminated poly(dimethylsiloxane-silicate) copolymers, trimethylsiloxy terminated poly(dimethylsiloxane-vinylmethylsiloxane-silicate) copolymers and trimethylsiloxy terminated poly(dimethylsiloxane-hexenylmethylsiloxane-silicate) copolymers, vinylsiloxy or hexenylsiloxy terminated poly(dimethylsiloxane-hydrocarbyl) copolymers, vinylsiloxy terminated or hexenylsiloxy terminated poly(dimethylsiloxane-polyoxyalkylene) block copolymers, alkenyloxydimethylsiloxy terminated polyisobutylene and alkenyloxydimethylsiloxy terminated polydimethylsiloxane-polyisobutylene block copolymers.

Examples of preferred Component (A) compounds include hexenyldimethylsiloxy-terminated polydimethylsiloxane-polymethylhexenylsiloxane copolymers, hexenyldimethylsiloxy-terminated polydimethylsiloxane polymers, vinyldimethylsiloxy-terminated polydimethylsiloxane polymers, vinyl or hexenyldimethylsiloxy-terminated poly(dimethylsiloxane-silicate) copolymers and vinyl or hexenyldimethylsiloxy terminated poly(dimethylsiloxane-hydrocarbyl) copolymers, having a degree of polymerization (Dp) of from 25 to 500 and a viscosity at 25° C. of from 50 to 3,000 millipascal-seconds (mPa·s).

It is more preferred that Component (A) is a compound selected from hexenyldimethylsiloxy-terminated polydimethylsiloxane-polymethylhexenylsiloxane copolymers, vinyldimethylsiloxy-terminated polydimethylsiloxane polymers, vinyldimethylsiloxy-terminated poly(dimethylsiloxane-silicate) copolymers each having a Dp of from 50 to 300 and a viscosity at 25° C. of from 80 to 1,000 mPa·s.

Component (A) comprises at least one compound having at least one aliphatic unsaturation. This means Component (A) may be one compound having at least one aliphatic saturation or a mixture of different compounds. Component (A) can also have one or more aliphatic unsaturations. In preferred embodiments, component (A) comprises at least one compound having at least two aliphatic unsaturations. Most preferred is when component (A) comprises one compound having at least two aliphatic unsaturations Generally, 0 to 99 parts by weight of component (A) based on total weight percent solids (all non-solvent ingredients) is used in the composition. It is preferred to add 15 to 99 parts by weight of component (A) on the same basis. Component (A) compounds may be made by methods known in the art or are commercially available.

Component (B) comprises at least one organohydrogensilicon compound containing at least one silicon-bonded hydrogen atom per molecule described by formula (III)

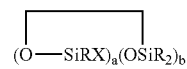

where each R is independently selected from a hydrogen atom and a monovalent hydrocarbon group comprising 1 to 20 carbon atoms which is free from aliphatic unsaturation, a is an integer from 1 to 18, b is an integer from 1 to 19; preferably 2 to 19, a+b is an integer from 3 to 20, each X is an independently selected functional group selected from a halogen atom, an ether group, an alkoxy group, an alkoxyether group, an acyl group, an epoxy group, an amino group, or a silyl group, or a $-Z-R^4$ group, where each Z is independently selected from an oxygen and a divalent hydrocarbon group comprising 2 to 20 carbon atoms, each $R^4$ group is independently selected from $—BR_uY_{2-u}$, $—SiR_vY_{3-v}$, or a group described by formula (IV):

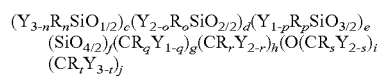

where B refers to boron, each R is as described above, the sum of $c+d+e+f+g+h+i+j$ is at least 2, n is an integer from 0 to 3, o is an integer from 0 to 2, p is an integer from 0 to 1, q is an integer from 0 to 1, r is an integer from 0 to 2, s is an integer from 0 to 2, t is an integer from 0 to 3, u is an integer from 0 to 2, v is an integer from 0 to 3, each Y is an independently selected functional group selected from a halogen atom, an ether group, an alkoxy group, an alkoxyether group, an acyl group, an epoxy group, an amino group, or a silyl group, or a Z-G group, where Z is as described above, each G is a cyclosiloxane described by formula (V):

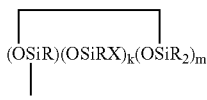

where R and X are as described above, k is an integer from 0 to 18, m is an integer from 0 to 18, k+m is an integer from 2 to 20, provided in formula (IV) that one of the Y groups is replaced by the Z group bonding the $R^4$ group to the cyclosiloxane of formula (III), and provided further if g+h+i+j>0 then c+d+e+f>0.

In formulas (III), (IV), and (V), each R group is an independently selected hydrogen atom or monovalent hydrocarbon group comprising 1 to 20 carbon atoms free from aliphatic unsaturation. Each monovalent hydrocarbon groups of R can be linear, branched or cyclic. Each monovalent hydrocarbon group of R can be unsubstituted or substituted with halogen atoms. Examples of the monovalent hydrocarbon group of R are as described above for $R^{1}$'. It is preferred that each R group is independently selected from hydrogen atoms, alkyl groups comprising 1 to 8 carbon atoms, or aryl groups comprising 6 to 9 carbon atoms. It is most preferrred that each R group is independently selected from hydrogen, methyl, alpha-methylstyryl, 3,3,3-trifluoropropyl and nonafluorobutylethyl. Each R can be identical or different, as desired.

In formulas (III) and (V), each X is an independently selected functional group selected from an ether group, an alkoxy group, an alkoxyether group, an acyl group, an epoxy group, an amino group, or a silyl group, or a -Z-$R^4$ group.

The functional groups represented by X are selected from halogen atoms, ether groups, alkoxy groups, alkoxyether groups, acyl groups, epoxy groups, amino groups, or silyl groups. Examples of useful functional groups include chloro, fluoro, bromo, methoxy, ethoxy, isopropoxy, and oxybutylvinyl ether. Other useful functional groups are derived by hydrosilylation of the alkenyl group from methylvinylether, methylvinylketone, vinylacetate, vinylbenzoate, vinylacrylate, vinylstearate, vinyldecanoate, vinylmethacrylate, vinylcyclohexylepoxide, allylglycidylether, vinylcyclohexylepoxidetrimethoxysilane, trimethylvinylsilane, triethylvinylsilane, vinyltrimethoxysilane, vinyltriacetoxysilane, vinylpyridine, phenylvinylether, phenylvinylketone, and allyl aldehyde with an SiH from the siloxane precursor to formulas (III) or (V), where the term siloxane precursor includes the siloxane material used to make the initial formula (III) or (V) material and any initial formula (III) material which can then be further reacted.

When X is a functional group, it is preferred that each X is independently selected from chloro, methoxy, isopropoxy, and groups derived by hydrosilylation of the alkenyl group from hydroxybutylvinyl ether, vinylcyclohexylepoxide, and allylglycidyl ether with an SiH from the siloxane precursor to formulas (III) or (V), where the term siloxane precursor includes the siloxane material used to make the initial formula (III) or (V) material and any initial formula (III) material which can then be further reacted. It is more preferred that when X is a functional group that it is derived by hydrosilylation of the alkenyl group from allyl glycidyl ether with an SiH from the siloxane precursor to formulas (III) (ie. propylglycidyl ether).

Each X of formulas (III) and (V) may also comprise a Z-$R^4$ group. It is preferred that X is a Z-$R^4$ group. It is more preferred that X includes both -Z-$R^4$ groups and functional groups derived by hydrosilylation of allylglycidyl ether (ie. propylglycidyl ether) or vinylcyclohexylepoxide. It is most preferred that the functional group be derived from hydrosilylation of allylglycidyl ether (ie. propylglycidyl ether).

Each Z is independently selected from oxygen and divalent hydrocarbon groups comprising 2 to 20 carbon atoms. Examples of the divalent hydrocarbon group comprising 2 to 20 carbon atoms represented by Z include alkylene radicals such as methylene, ethylene, methylmethylene, propylene, isopropylene, butylene, pentylene, hexylene, and octadecylene; alkenylene radicals such as vinylene, allylene, butenylene, and hexenylene, arylene radicals such as phenylene and xylylene; aralkylene radicals as benzylene; and alkarylene radicals such as tolylene. Preferably, Z is a divalent hydrocarbon group comprising 2 to 18 carbon atoms. It is more preferred for Z to be an alkylene group, with an alkylene group comprising 2 to 8 carbon atoms being most preferred.

Each $R^4$ group is selected from $-BR_uY_{2-u}$, $-SiR_vY_{3-v}$, or a group described by formula (III) $(Y_{3-n}R_nSiO_{1/2})_c(Y_{2-o}R_oSiO_{2/2})_d(Y_{1-p}R_pSiO_{3/2})_e(SiO_{4/2})_f(CR_qY_{1-q})_g(CR_rY_{2-r})_h(O(CR_sY_{2-s})_i(CR_tY_{3-t})_j$, where R, Y, c, d, e, f, g, h, i, j, n, o, p, q, r, s, t, u, v are as described above, provided in formula (IV) that one of the Y groups is replaced by the Z group bonding the $R^4$ group to the cyclosiloxane of formula (III).

In formula (III), a is an integer from 1 to 18, b is an integer from 1 to 19, preferably from 2 to 19, and a+b is an integer from 3 to 20.

In formula (IV), the sum of c+d+e+f+g+h+i+j is at least 2, preferably from 2 to 5300, more preferably from 2 to 1000. Preferably, subscript c is an integer from 0 to 50, with 2 to 15 being more preferred, and 2 to 10 being most preferred. Preferably, subscript d is an integer from 0 to 5000, with 0 to 1000 being more preferred, and 1 to 50 being most preferred. Preferably, subscript e is an integer from 0 to 48, with 0 to 13 being more preferred, and 0 to 8 being most preferred. Preferably, subscript f is an integer from 0 to 24, with 0 to 6 being more preferred, and 0 to 4 being most preferred. Preferably, subscript g is an integer from 0 to 50, with 0 to 20 being more preferred, and 0 to 10 being most preferred. Preferably, subscript h is an integer from 0 to 50, with 0 to 20 being more preferred, and 0 to 10 being most preferred. Preferably, subscript i is an integer from 0 to 50, with 0 to 20 being more preferred, and 0 to 10 being most preferred. Preferably, subscript j is an integer from 0 to 50, with 0 to 15 being more preferred, and 0 to 10 being most preferred.

In formula (IV), n is an integer from 0 to 3, preferably from 2 to 3; o is an integer from 0 to 2, preferably from 1 to 2; p is an integer from 0 to 1, preferably 1; q is an integer from 0 to 1, preferably 1; r is an integer from 0 to 2, preferably from 1 to 2; s is an integer from 0 to 2, preferably from 1 to 2; and t is an integer from 0 to 3, preferably from 2 to 3. Notwithstanding the above, since the $R^4$ group as described by formula (IV) is connected to the cyclosiloxane described by formula (III) via a Z group, one of the Y groups present in the $R^4$ group described by formula (IV) will be replaced by a Z group.

In addition to a group described by formula (IV) each $R^4$ group is independently selected from $-BR_uY_{2-u}$, and —SiR$_v$Y$_{3-v}$ where B refers to boron, u is an integer from 0 to 2, preferably from 1 to 2 and v is an integer from 0 to 3, preferably from 2 to 3. Examples of these R$^4$ groups are derived from borane or silanes, such as for example, trivinylborane, diallyldimethylsilane, divinyldimethylsilane and vinyltrimethylsilane.

Each Y of R$^4$ is an independently selected functional group selected from a halogen atom, an ether group, an alkoxy group, an alkoxyether group, an acyl group, an epoxy group, an amino group, or a silyl group, or a -Z-G group. The functional groups are exemplified as described above for X. The Z group is also as described above.

Each G is a cyclosiloxane described by formula (V):

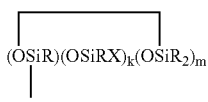

where R and X are as described above, k is an integer from 0 to 18, m is an integer from 0 to 18, and k+m is an integer from 2 to 20.

In formula (V), each k is an integer from 0 to 18, preferably from 1 to 3.

In formula (V), each m is an integer from 0 to 18, preferably from 1 to 10, most preferably from 2 to 4.

The sum of k+m is an integer from 2 to 20, preferably from 2 to 6, most preferably from 2 to 5.

The Y group of formula (IV) is preferably a -Z-G group. Although it is not required for there to be any -Z-G groups in the organohydrogensilicon compound of the present invention, it is preferred that on average the organohydrogensilicon compounds contain at least 1 -Z-G group with at least 2 -Z-G groups being more preferred.

The R$^4$ group described by formula (IV) can be linear, cyclic, branched or resinous. The R$^4$ group described by formula (IV) can be a siloxane material where the polymer chain units contain only siloxane units, or it can be a mixture of siloxane units with hydrocarbon units or oxyhydrocarbon units, where oxyhydrocarbon refers to a hydrocarbon group which also includes at least one oxygen atom. It is preferred that the R$^4$ group is a siloxane material, and more preferred that R$^4$ is a linear siloxane material.

Examples of preferred R$^4$ groups described by formula (IV) useful in the invention include —R$_2$SiO(R$_2$SiO)$_d$SiR$_2$-Z-G, —R$_2$SiOSiR$_3$, —R$_2$SiOSiR$_2$—Y, —RSi(OSiR$_3$)$_2$, where d is an integer from 1 to 50 and Z, G, and R are as described above. More preferred R$^4$ groups are as described above when R is methyl, and d is an average of 8.

With respect to the organohydrogensilicon compounds useful in the present invention it is preferred that if g+h+i+j>0 then c+d+e+f>0. It is more preferred that (a) at least one X group of Formula (III) is a -Z-R$^4$ group (b) if Z is a divalent hydrocarbon group, a=1, c=2, e+f+g+h+i+j=0 and d>0, then at least one d unit (ie. Y$_{2-o}$R$_o$SiO$_{2/2}$) contain a -Z-G group or the c units (ie. Y$_{3-n}$R$_n$SiO$_{1/2}$) have no -Z-G group or at least two -Z-G groups, and (c) if Z is a divalent hydrocarbon group, a=, c=2 and d+e+f+g+h+i+j=0, then the c units (ie. Y$_{3-n}$R$_n$SiO$_{1/2}$) have no -Z-G group or at least two -Z-G groups.

It is also preferred that the organohydrogensilicon compounds useful in the present invention have a viscosity from 5 to 50,000 mPa·s, more preferred from 10 to 10,000 mPa·s and most preferred from 25 to 2,000 mPa·s.

The organohydrogensilicon compounds contain at least one silicon-bonded hydrogen atom per molecule. Preferably, the organohydrogensilicon compounds contain at least 2 silicon-bonded hydrogen atoms per molecule. It is most preferred that the organohydrogensilicon compounds contain at least 3 silicon-bonded hydrogen atoms per molecule.

Examples of the types of organohydrogensilicon compounds described by formula (III) useful in the present composition are as follows where Me is methyl, d (which equals d$_1$+d$_2$) is as described above, and x can range from 1 to 100; preferably 1 to 20.

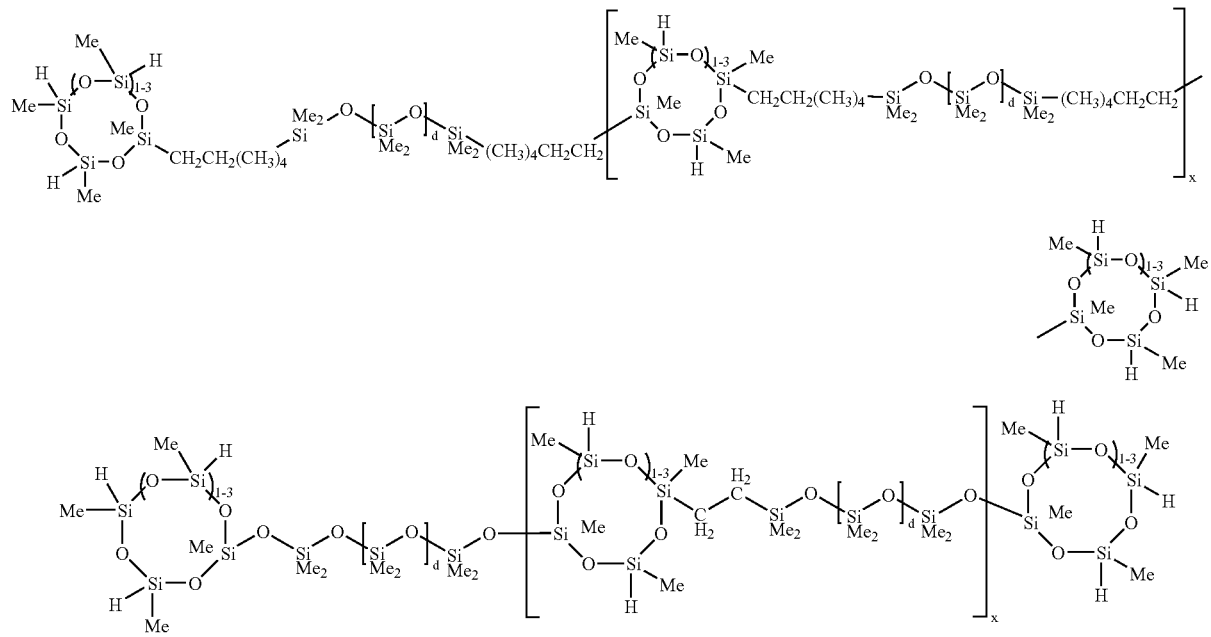

-continued
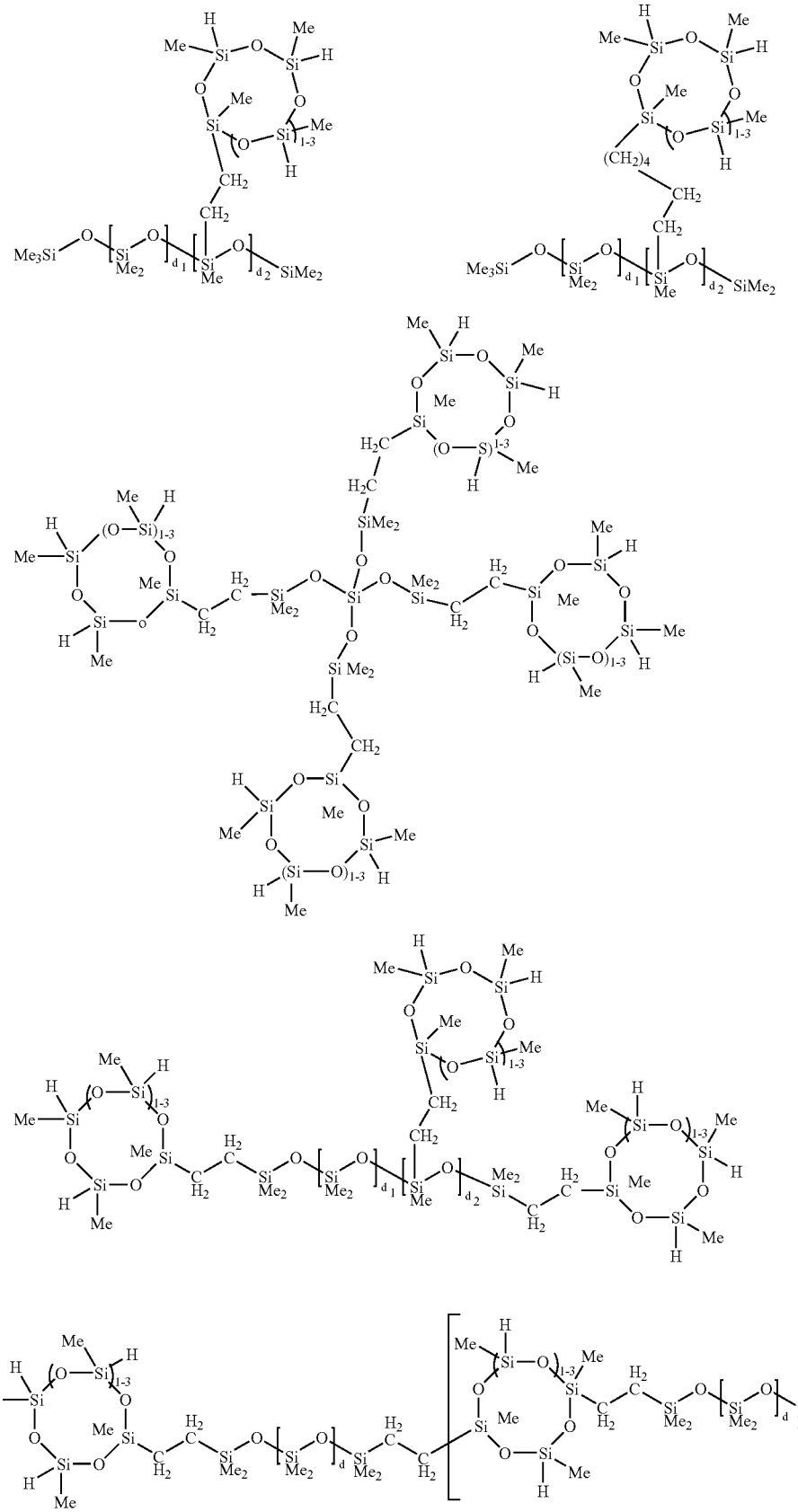

-continued
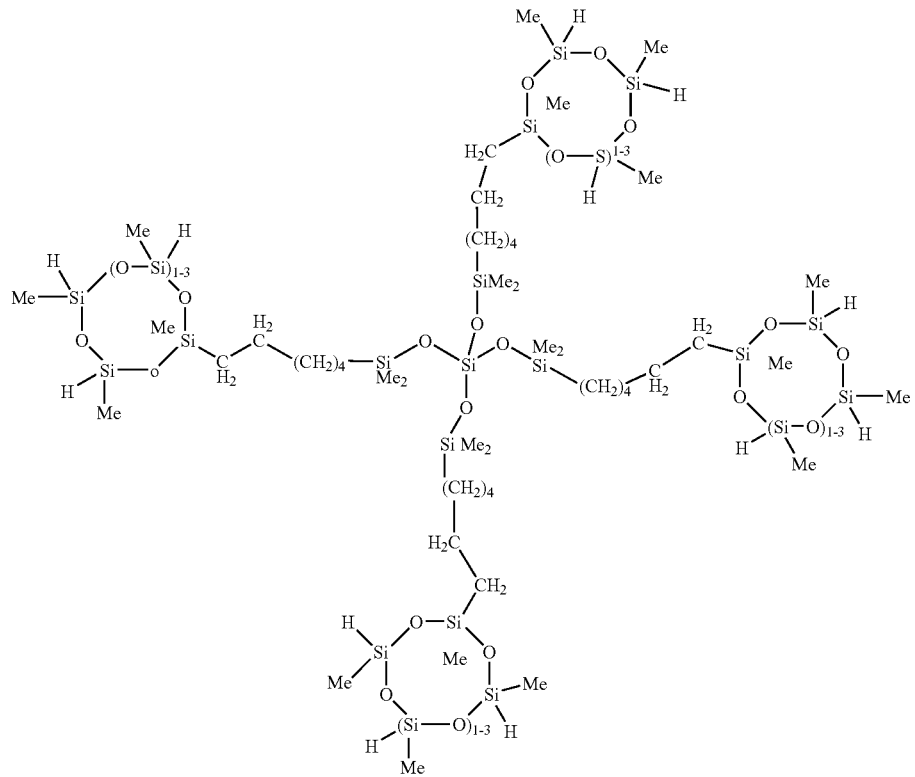
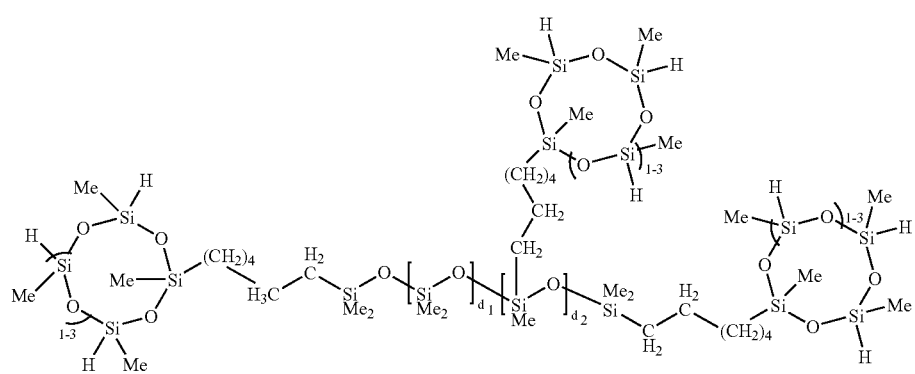

-continued

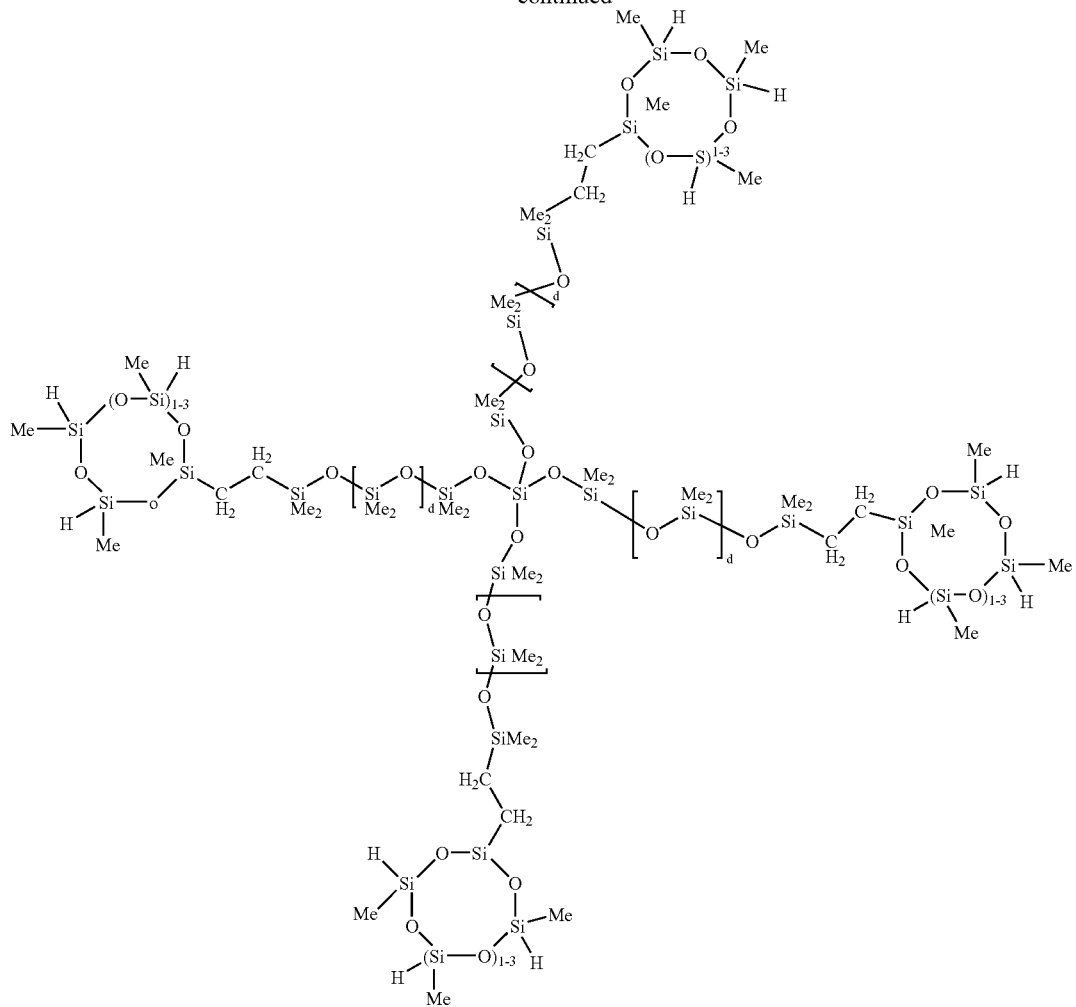

Other example include the compounds described above where certain of the SiH bonds are replaced with such other groups, more preferably 5 to 50%, most preferably 10 to 30%

Examples of the hydrocarbon, oxyhydrocarbon and functional groups described above include the described later in this specification for group A. Preferred groups include functional groups derived by hydrosilylation of allylglycidyl ether (ie. propylglycidyl ether) or vinylcyclohexylepoxide, alkyl groups such as 1-hexyl, 1-octyl, and ethylcyclohexene and alkcenyl groups such as 5-hexenyl. It is most preferred that the SiH bonds are replaced by functional groups derived by hydrosilylation of allylglycidyl ether.

The most preferred organohydrogensilicon compounds described by formula (III) include the compound described below where Me is methyl, d is an average of 8 and x is an integer from 1 to 15 and the compound described below when 10 to 30% of the SiH bonds are replaced by functional groups derived by hydrosilylation of allylglycidyl ether.

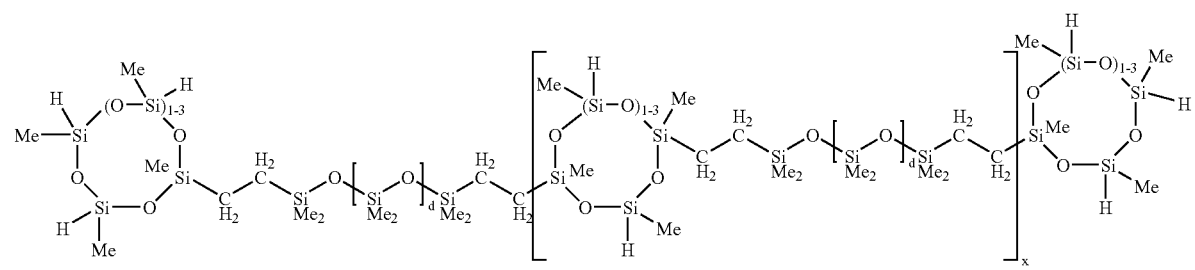

The amounts of component (A) and component (B) used to prepare the present composition will depend on the individual components and the desired SiH to aliphatic unsaturation ratio. The ratio of SiH in component (B) to aliphatic unsaturation from component (A) useful to prepare the compositions of the present invention can be from 0.5:1 to 4:1. It is preferred that a SiH to aliphatic unsaturation ratio of 1:1 to 3.5:1 be used with a ratio of 1.5:1 to 3:1 being most preferred. If components (A) and (B) are not the only materials containing aliphatic unsaturated groups and SiH-containing groups in the present composition, then the above ratios relate to the total amount of such groups present in the composition rather than only those components.

Component (C) comprises any catalyst typically employed for hydrosilylation reactions. It is preferred to use platinum group metal-conining catalysts. By platinum group it is meant ruthenium, rhodium, palladium, osmium, iridium and platinum and complexes thereof. Platinum group metal-containing catalysts useful in preparing the compositions of the present invention are the platinum complexes prepared as described by Willing, U.S. Pat. No. 3,419,593, and Brown et al, U.S. Pat. No. 5,175,325, each of which is hereby incorporated by reference to show such complexes and their preparation. Other examples of useful platinum group metal-containing catalysts can be found in Lee et al., U.S. Pat. No. 3,989,668; Chang et al., U.S. Pat. No. 5,036,117; Ashby, U.S. Pat. No. 3,159,601; Lamoreaux, U.S. Pat. No. 3,220,972; Chalk et al., U.S. Pat. No. 3,296,291; Modic, U.S. Pat. No. 3,516,946; Karstedt, U.S. Pat. No. 3,814,730; and Chandra et al., U.S. Pat. No. 3,928,629 all of which are hereby incorporated by reference to show useful platinum group metal-containing catalysts and methods for their preparation. The platinum-containing catalyst can be platinum metal, platinum metal deposited on a carrier such as silica gel or powdered charcoal, or a compound or complex of a platinum group metal. Preferred platinum-containing catalysts include chloroplatinic acid, either in hexahydrate form or anhydrous form, and or a platinum-containing catalyst which is obtained by a method comprising reacting chloroplatinic acid with an aliphatically unsaturated organosilicon compound such as divinyltetramethyldisiloxane, or alkene-platinum-silyl complexes as described in U.S. patent application Ser. No. 10/017,229, filed Dec. 7, 2001, such as (COD)Pt(SiMeCl$_2$)$_2$, where COD is 1,5-cyclooctadiene and Me is methyl. These alkene-platinum-silyl complexes may be prepared, for example by mixing 0.015 mole (COD)PtCl$_2$ with 0.045 mole COD and 0.0612 moles HMeSiCl$_2$.

The appropriate amount of the catalyst will depend upon the particular catalyst used. The platinum catalyst should be present in an amount sufficient to provide at least 2 parts per million (ppm), preferably 5 to 200 ppm of platinum based on total weight percent solids (all non-solvent ingredients) in the composition. It is highly preferred that the platinum is present in an amount sufficient to provide 5 to 150 weight ppm of platinum on the same basis. The catalyst may be added as a single species or as a mixture of two or more different species. Adding the catalyst as a single species is preferred.

The compositions of the present invention may also comprise an inhibitor (D). This optional component (D) can be any material that is known to be, or can be, used to inhibit the catalytic activity of platinum group metal-containing catalysts. As used herein, the term "inhibitor" means a material that retards activity of a catalyst at room temperature but does not interfere with the properties of the catalyst at elevated temperatures. Examples of suitable inhibitors include ethylenically or aromatically unsaturated amides, acetylenic compounds, silylated acetylenic compounds, ethylenically unsaturated isocyanates, olefinic siloxanes, unsaturated hydrocarbon monoesters and diesters, conjugated ene-ynes, hydroperoxides, nitriles, and diaziridines.

Preferred inhibitors include acetylenic alcohols exemplified by 1-ethynyl-1-cyclohexanol, 2-methyl-3-butyn-2-ol, 2-phenyl-3-butyn-2-ol, 2-ethynyl-isopropanol, 2-ethynyl-butane-2-ol, and 3,5-dimethyl-1-hexyn-3-ol, silylated acetylenic alcohols exemplified by trimethyl (3,5-dimethyl-1-hexyn-3-oxy)silane, dimethyl-bis-(3-methyl-1-butyn-oxy) silane, methylvinylbis(3-methyl-1-butyn-3-oxy)silane, and ((1,1-dimethyl-2-propynyl)oxy)trimethylsilane, unsaturated carboxylic esters exemplified by diallyl maleate, dimethyl maleate, diethyl fumarate, diallyl fumarate, and bis-2-methoxy-1-methylethylmaleate, mono-octylmaleate, mono-isooctylmaleate, mono-allyl maleate, mono-methyl maleate, mono-ethyl fumarate, mono-allyl fumarate, and 2-methoxy-1-methylethylmaaleate; conjugated ene-ynes exemplified by 2-isobutyl-1-butene-3-yne, 3,5-dimethyl-3-hexene-1-yne, 3-methyl-3-pentene-1-yne, 3-methyl-3-hexene-1-yne, 1-ethynylcyclohexene, 3-ethyl-3-butene-1-yne, and 3-phenyl-3-butene-1-yne, vinylcyclosiloxanes such as 1,3,5,7-tetramethyl-1,3,5,7-tetravinylcyclotetrasiloxane, and a mixture of a conjugated ene-yne as described above and a vinylcyclosiloxane as described above.

Most preferred inhibitos are diallyl maleate, bis-2-methoxy-1-methylethylmaleate, 1-ethynyl-1-cyclohexanol, and 3,5-dimethyl-1-hexyn-3-ol.

When used, it is preferred that from 0.03 to 10 parts by weight of inhibitor be used based on total weight percent solids (all non-solvent ingredients) in the composition. It is most preferred that 0.03 to 2 parts by weight of inhibitor be used on the same basis.

Although the use of Component (B) improves the bath life of compositions, sometimes it may be desirable to extend the bath life for an even longer period of time. As used herein, "bath life" means the time it takes a fully formulated coating composition to double in viscosity at 40° C. Therefore, a further optional ingredient of the present composition is a bath life extender (E) which may be added in a total amount sufficient to further retard the curing reaction at room temperature. Examples of suitable bath life extenders include compounds which contain one or more primary or secondary alcohol groups, carboxylic acids (including compounds which yield carboxylic acids when exposed to water at room temperature), cyclic ethers, and water. Included in this group are the primary and secondary alcohols; diols and triols, such as ethylene glycol, propylene glycol and glycerine; partial ethers of diols and triols, such as 2-methoxyethanol, 2-methoxypropanol, and 2-methoxyisopropanol; tetrahydrofuran; water and aqueous solutions of mineral acids, alkalis, and salts. Primary and secondary alcohols, preferably having fewer than 10 carbon atoms are the most preferred for the compositions of this invention. Examples include methanol, 1-butanol, 2-butanol, tetradecanol and other alkanols, such as ethanol, and normal-, and iso-propanol, iso-butanol, and the normal-, secondary-, and iso-pentanols, -hexanols, -heptanols, and -octanols; benzyl alcohol, phenol, and other aromatic alcohols such as methylphenyl carbinol, and 2-phenylethyl alcohol; allyl alcohol, and cyclohexanol. It is highly preferred that the bath life extender is benzyl alcohol or water.

When included in the present composition, it is preferred that from 0.005 to 10 parts by weight bath life extender (E) based on total weight percent solids (all non-solvent ingredients) in the composition be used. More preferably, the amount of bath life extender to be used falls within the range of 0.005 to 5 parts on the same basis, and most preferably 0.005 to 1 part by weight based on total weight percent solids (all non-solvent ingredients) in the composition.

The compositions of the present invention may also optionally comprise (F) a release additive. Any of the well-known release additives in the art may be employed. Generally, the release additive comprises a silicone resin and may include at least one additional component selected from the following components: (i) an alkenylated polydiorganosiloxane, (ii) one or more primary alkenes containing from 14 to 30 carbon atoms, and (iii) one or more branched alkenes containing at least 10 carbon atoms.

The siloxane resin consists essentially of $R^2_3SiO_{1/2}$ units (also known as M units) and $SiO_{4/2}$ units (also known as Q units) where each $R^2$ is independently selected from hydrogen, a monovalent hydrocarbon group comprising 1 to 20 carbon atoms free of aliphatic unsaturation or a monovalent hydrocarbon group comprising 2 to 20 carbon atoms having aliphatic unsaturation.

Examples of the monovalent hydrocarbon groups free of aliphatic unsaturation of $R^2$ are as described above for such groups of R. Examples of the monovalent hydrocarbon groups having at least one aliphatic unsaturation of $R^2$ are as described later in the specification for such groups of A. Preferably each $R^2$ is independently selected from a monovalent hydrocarbon group comprising 1 to 20 carbon atoms free of aliphatic unsaturation or a monovalent hydrocarbon group comprising 2 to 20 carbon atoms having at least one aliphatic unsaturation. The molar ratio of $R^2_3SiO_{1/2}$ units to $SiO_{4/2}$ is from 0.6:1 to 4:1, preferably from 0.6:1 to 1.9:1, and most preferably from 0.7:1 to 1.6:1.

The release additive may also comprise one or more of (i) an alkenylated polydiorganosiloxane, (ii) one or more primary alkenes containing from 14 to 30 carbon atoms, or iii) one or more branched alkenes containing at least 10 carbon atoms.

Preferred alkenylated polydiorganosiloxanes (i) include those described later in the specification for component (A). Each primary alkene (ii) used may be any primary alkene containing from 10 to 30 carbon atoms such as, for example, tetradecene and octadecene. Each branched alkene (iii) used may be any one or more suitable branched alkenes where the total number of carbons is at least 10 and preferably at least 20.

The release modifier generally comprises from 5 to 85 weight percent and preferably from 25 to 85 weight percent of the siloxane resin, the remainder being made up of one or more of components (i), (ii), or (iii).

Although optional, when used in a coating composition, it is preferred that 5 to 99 parts by weight of the release modifier be added based on total weight percent solids (all non-solvent ingredients) in the composition.

The compositions of the present invention can further comprise other optional components commonly used in platinum group metal catalyzed organosilicon compositions, such as reinforcing and extending fillers, mist reducing additives, anchorage additives, hydrocarbon and halohydrocarbon solvents, colorants, stabilizers, and adhesive-release modifiers such as non-functional fluids or gums.

The compositions of this invention may also contain up to 99 parts by weight of a solvent, however, it is preferred that the solvent, if employed, range from 70 to 90 parts by weight, said weight being based on total weight percent solids (all non-solvent ingredients) in the composition. Examples of useful solvents include toluene, xylene, methylisobutylketone, isopropanol, and heptane.

A preferred embodiment of the present invention is a curable coating composition. These compositions may be applied out of solvent or as an oil in water emulsion.

Components (A), (C), and optional components (D)-(F) are commercially available or can be made by methods known in the art. The organohydrogensilicon compounds (component (B)) described by Formula (III) can be made in a straightforward manner, for example via a platinum catalyzed coupling of methylhydrogencyclosiloxanes with a reactant containing aliphatic unsaturation, hydroxy functionalities or a mixture of both. The desired product is a function not only of the reactants but also of the reaction stoichiometry. The reaction can be conducted by premixing the reactants followed by catalysis or by using one of the reactants as a controlling reagent. Once an initial organohydrogensilicon compound is prepared, subsequent hydrosilylations or condensations may also be done to replace or convert some of the remaining SiH bonds to other types of groups. After the desired organohydrogensilicon compound is made it is preferred to deactivate the catalyst using an inhibitor.

Generally, the ratio of SiH to aliphatic unsaturation or SiH to hydroxy functionality useful to prepare the organohydrogensilicon compounds of component (B) of the present composition is at least 2.5:1. It is preferred that a ratio of SiH to aliphatic unsaturation ratio or SiH to hydroxy functionality of 20:1 to 2.5:1 be used with a ratio of 4:1 to 3:1 being most preferred. Notwithstanding the above, if organohydrogensilicon compounds described by formula (III) which are prepared using the above ratios are then further hydrosilylated or condensed, for example to convert or replace some of the remaining SiH groups and form other organohydrogensilicon compounds described by formula (III), the ratio of SiH to aliphatic unsaturation or SiH to hydroxy functionality to be used for these subsequent reactions need not follow the above recommendations but rather is limited only by the amount of SiH which is desired on such final organohydrogensilicon compound.

In one method, the organohydrogensilicon compounds having at least one silicon-bonded hydrogen are prepared by (1) mixing (A1) at least one organohydrogen cyclosiloxane comprising at least 2 SiH bonds per molecule and having the formula

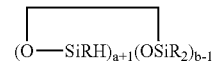

with (B1) at least one compound comprising at least one aliphatic unsaturation or at least one hydroxy group per molecule described by $BR_uA_{3-u}$, $SiR_vA_{4-v}$, or a group described by formula $(A_{3-n}R_nSiO_{1/2})_c(A_{2-o}R_oSiO_{2/2})_d$ $(A_{1-p}SiO_{3/2})_e(SiO_{4/2})_f(CR_qA_{1-q})_g(CR_rA_{2-r})_h(O(CR_sA_{2-s})_i$ $(CR_tA_{3-t})_j$ so that ratio of SiH bonds in component (A1) to the aliphatic unsaturation or hydroxy group of component (B1) is at least 2.5:1; (2) effecting a reaction between components (A1) and (B1) in the presence of (C1) a catalyst to form a reaction mixture comprising organohydrogensilicon compounds having at least one SiH bond per molecule; (3) optionally, adding an inhibitor to the reaction mixture; and (4) optionally, isolating the organohydrogen silicon compounds; where B is boron, X, R, a, b, c, d, e, f, g, h, i, j, n, o, p, q, r, s, t, u, v are as defined above, and each A is independently selected from a hydroxy group, a monovalent hydrocarbon group comprising at least one aliphatic unsaturation and 2 to about 20 carbon atoms, a monovalent oxyhydrocarbon group comprising at least one aliphatic unsaturation and 2 to about 20 carbon atoms, or a functional group selected from a halogen atom, an ether group, an alkoxy group, an alkoxyether group, an acyl group, an epoxy group, an amino group, or a silyl group, provided at least one A group has an aliphatic unsaturation or a hydroxy group.

In another method, the organohydrogensilicon compounds having at least one silicon-bonded hydrogen are prepared by (1') mixing (A1) at least one organohydrogen cyclosiloxane comprising at least 2 SiH bonds per molecule and having the formula

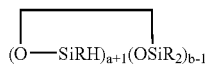

with (C1) a catalyst to form a SiH premix; (2') effecting a reaction by adding to the SiH premix (B1) at least one compound comprising at least one aliphatic unsaturation or at least one hydroxy group per molecule described by $BR_uA_{3-u}$, $SiR_vA_{4-v}$, or a group described by formula $(A_{3-n}R_nSiO_{1/2})_c(A_{2-o}R_oSiO_{2/2})_d(A_{1-p}R_pSiO_{3/2})_e(SiO_{4/2})_f$ $(CR_qA_{1-q})_g(CR_rA_{2-r})_h(O(CR_sA_{2-s})_i(CR_tA_{3-t})_j$ so that ratio of SiH bonds in component (A1) to the aliphatic unsaturation or hydroxy group of component (B1) is at least 2.5 to form a reaction mixture comprising organohydrogen silicon compounds having at least one SiH bond per molecule; (3') optionally, adding an inhibitor to the reaction mixture; and (4') optionally, isolating the organohydrogen silicon compounds; where B is boron, and A, X, R, a, b, c, d, e, f, g, h, i, j, n, o, p, q, r, s, t, u, and v are as defined above.

In another method, the organohydrogensilicon compounds having at least one silicon-bonded hydrogen are prepared by (1") mixing (B1) at least one compound comprising at least one aliphatic unsaturation or at least one hydroxy group per molecule described by $BR_uA_{3-u}$, $SiR_vA_{4-v}$, or a group described by formula $(A_{3-n}R_nSiO_{1/2})_c$ $(A_{2-o}R_oSiO_{2/2})_d(A_{1-p}R_pSiO_{3/2})_e(SiO_{4/2})_f(CR_qA_{1-q})_g$ $(CR_rA_{2-r})_h(O(CR_sA_{2-s})_i(CR_tA_{3-t})_j$, with (C1) a catalyst to form a aliphatic unsaturation premix or hydroxy premix respectively; (2") effecting a reaction by adding the aliphatic unsaturation premix or hydroxy premix to (A1) at least one organohydrogen cyclosiloxane comprising at least 2 SiH bonds per molecule and having the formula

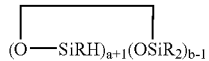

so that ratio of SiH bonds in component (A1) to the aliphatic unsaturation or hydroxy group of component (B1) is at least 2.5 to form a reaction mixture comprising organohydrogen silicon compounds having at least one SiH bond per molecule (3") optionally, adding an inhibitor to the reaction mixture; and (4") optionally, isolating the organohydrogen silicon compounds; where B is boron, and A, X, R, a, b, c, d, e, f, g, h, i, j, n, o, p, q, r, s, t, u, and v are as defined above.

Each A group may be independently selected from functional groups selected from a halogen atom, an ether group, an alkoxy group, an alkoxyether group, an acyl group, an epoxy group, an amino group, or a silyl group. Examples of such functional groups represented by A are as described above for X.

Each A group may also be independently selected from hydroxy groups, monovalent hydrocarbon groups comprising 2 to 20 carbon atoms having aliphatic unsaturation and monovalent oxyhydrocarbon groups comprising 2 to 20 carbon atoms having aliphatic saturation. The aliphatic unsaturations of A can be found in a pendant position to the hydrocarbon chain, at the end of the hydrocarbon chain, or both, with the terminal position being preferred. Each monovalent hydrocarbon group and oxyhydrocarbon group of A can be linear, branched or cyclic and may be unsubstituted or substituted with halogen atoms. Examples of monovalent hydrocarbon groups comprising 2 to 20 carbon atoms having aliphatic unsaturation include alkenyl groups such as vinyl, allyl, 3-butenyl, 4-pentenyl, 5-hexenyl, cyclohexenyl, 6-heptenyl, 7-octenyl, 8-nonenyl, 9-decenyl, 10-undecenyl, and diene groups comprising 4 to 20 carbon atoms such as 4,7-octadienyl, 5,8-nonadienyl, 5,9-decadienyl, 6,11-dodecadienyl, 4,8-nonadienyl, and 7,13-tetradecadienyl. Examples of monovalent oxyhydrocarbon groups comprising 2 to 20 carbon atoms include alkenyloxy groups such as oxybutylvinylether and alkynyloxy groups such as propargyloxy or hexynyloxy.

Preferably, each A is independently selected from a monovalent hydrocarbon group comprising 2 to 20 carbon atoms having at least one aliphatic unsaturation, a hydroxy group, or an epoxy group. It is more preferred for each A to be an independently selected alkenyl group comprising 2 to 20 carbon atoms, with an alkenyl group comprising 2 to 8 carbon atoms being most preferred for A.

The methods described above for making organohydrogensilicon compounds having at least one SiH group per molecule, are examples of some preferred methods and are not meant to describe all the various methods of making such materials. Depending on the starting materials used and the desired organohydrogensilicon compound, the initial organohydrogensilicon compound formed may be subjected to subsequent hydrosilylations and/or condensations utilizing at least one hydrocarbon, oxyhydrocarbon or functional compound having at least one aliphatic unsaturation or hydroxy group so to form the desired organohydrogensilicon compound having at least one SiH group per molecule as described by Formula (III).

The methods described above preferably further comprise step (2a), (2'a) or (2"a) adding at least one hydrocarbon, oxyhydrocarbon or functional compound having at least one aliphatic unsaturation or hydroxy group to the reaction mixture comprising organohydrogensilicon compounds having at least one SiH bond per molecule formed in step (2), (2'), or (2") respectively so to form a second reaction mixture comprising organohydrogensilicon compounds having at least one SiH bond per molecule where a certain percentage of SiH groups have been converted to hydrocarbon, oxyhydrocarbon or functional groups.

Examples of the hydrocarbon, oxyhydrocarbon and functional compounds having at least one aliphatic unsaturation or hydroxy group useful for these subsequent reactions include compounds which contain the type of groups described above for A so long as they also include either a aliphatic unsaturation or hydroxy group. Preferred compounds include functional compounds such as allylglycidyl ether and vinylcyclohexylepoxide, alkenes such as 1-hexene, 1-octene, and vinylcyclohexene, and dienes such as 1,5-hexadiene.

When these subsequent reactions are utilized it is preferred that 5 to 70% of the SiH groups are replaced or converted to hydrocarbon, oxyhydrocarbon or functional groups, more preferably 5 to 50% and most preferably 10 to 30%.

The compounds containing at least one aliphatic unsaturation or hydroxy group (component (B1)) and the organohydrogen cyclic siloxanes (component (A1)) used to make the organohydrogensilicon compounds (component (B)) may be prepared by known methods or are commercially available. It is preferred that the organohydrogen cyclic siloxanes used in the reaction are relatively pure and substantially free from oligomeric linears.

The catalysts (component (C1)) useful to make the organohydrogensilicon compounds are those catalysts typically employed for hydrosilylation and/or condensation reactions. It is preferred to use platinum group metal-containing catalysts. By platinum group it is meant ruthenium, rhodium, palladium, osmium, iridium and platinum and complexes thereof. Examples of these catalysts and useful amounts are the same as described above for component (C) when making the composition of the present invention.

After the desired organohydrogensilicon compound having at least one SiH bond is prepared, an additional preferred step is to deactivate the catalyst using an inhibitor. The inhibitors useful for this are those well known in the art and described above for Component (D) of the present invention. The optimal level of inhibitor used for deactivation will vary for each inhibitor. Generally, a level of 0.2 to 1 parts by weight based on total weight percent solids (all non-solvent ingredients) is desired.

The temperature of the reaction is not strictly specified, but generally falls within the range of about 20° to 150° C. The length of reaction time is also not critical, and is generally determined by the addition rate of controlling reagent.

Optionally, the reaction can be run using common solvents such as toluene, xylene, methylisobutylketone, and heptane.

Once the platinum catalyst has been deactivated, routine volatile stripping procedures can be used to remove unreacted polyorganohydrogen cyclic siloxanes and any solvent that may have been used.

The compositions of the present invention can be prepared by homogeneously mixing components (A), (B), and (C), and any optional components in any order using any suitable mixing means, such as a spatula, a drum roller, a mechanical stirrer, a three roll mill, a sigma blade mixer, a bread dough mixer, and a two roll mill. The present compositions can be supplied in any desired package combination including multi-component to single component packages. It is preferred that component (C), the platinum group metal-containing catalyst, be brought together in the presence of components (A), (B), (D), and any other optional components.

In other preferred embodiments, this invention relates to a method of making a cured coating and the cured coating, the method comprising the steps of (I) mixing: (A) at least one compound having at least two aliphatic unsaturation; (B) at least one organohydrogensilicon compound containing at least three silicon-bonded hydrogen atom per molecule and (C) a platinum group metal-containing catalyst which is present in an amount sufficient to catalyze the reaction (II) coating the mixture from (I) on the surface of a substrate; and (III) exposing the coating and the substrate to an energy source selected from (i) heat and (ii) actinic radiation in an amount sufficient to cure the coating. This method can further comprise applying a pressure sensitive adhesive on the coating after step (III). Components (A), (B) and (C) are as described above including preferred embodiments and amounts thereof.

By actinic radiation it is meant ultraviolet light; electron beam radiation; and alpha-, beta-, gamma- and x-rays. By heat it is meant infrared radiation, hot air, microwave radiation, etc. Of course actinic radiation is frequently accompanied by heat and the use of a combination of the two falls within the scope and spirit of the present method. In addition preferred method, the coating process can be accomplished by any suitable manner known in the art, such as by spreading, brushing, extruding, spraying, gravure, kiss-roll and air-knife.

In a preferred embodiment of the instant method, the solid substrate is a flexible sheet material such as paper, polyolefin film and polyolefin-coated paper or foil. Other suitable solid substrates that can be coated by the process of this invention include other cellulosic materials such as wood, cardboard and cotton; metallic materials such as aluminum, copper, steel and silver; siliceous materials such as glass and stone; and synthetic polymer materials such as polyolefins, polyamides, polyesters and polyacrylates. As to form, the solid substrate can be substantially sheet-like, such as a peelable release liner for pressure sensitive adhesive; a fabric or a foil; or substantially three-dimensional in form.

After the silicone coating composition has been coated onto a substrate it is heated and/or irradiated with actinic radiation, as noted herein, to cure the liquid coating and to adhere it to the substrate.

In a preferred embodiment of the coating method of this invention, a flexible sheet material, such as paper, polyolefin film and polyolefin-coated paper or foil, is coated with a thin coating of the silicone coating composition, preferably in a continuous manner and the thus-coated material is then heated and/or irradiated to rapidly cure the coating, to provide a sheetlike material bearing on at least one surface thereof an adhesive-releasing coating. The adhesive-releasing coating is subsequently brought into contact with a pressure sensitive adhesive, preferably in an in-line manner, to form an article having a peelable, i.e. releasable, adhesive/coating interface. Examples of such an article include, adhesive labels having a peelable backing, adhesive tape in roll form and adhesive packaged in a strippable container. The pressure sensitive adhesive can be non-silicon-based, such as the well-known acrylic or rubber types or silicon-based, such as the peroxide- or platinum-curable polydiorganosiloxane-based adhesives.

This method is also applicable to adhesive materials, other than pressure sensitive adhesives. Examples of said adhesive materials include foods, graphite composites, asphalt and gum polymers.

In addition to being useful for making coatings, the present compositions are also useful for making elastomers, adhesives, foams or fluids.

The following examples are disclosed to further teach, but not limit, the invention, which is properly delineated by the appended claims.

Test Methods

Gas Chromatography (GC)—GC data was collected on an HP5890A equipped with an FID and a J&W Scientific 30 m by 0.25 mm i.d. DB-1 column with 0.25 micron film thickness.

Gel Permeation Chromatography (GPC)—GPC data was collected using a Waters 515 pump, a Water 717 autosampler and a Waters 2410 differential refractometer. The separation was made with two (300 mm×7.5 mm) Polymer Laboratories Plgel 5 um Mixed-C columns, preceded by a Plgel 5 um guard column. HPLC grade toluene eluent was used at 1.0 mL/min flowrate and columns and detector were heated to 45° C. An injection volume of 50 uL was used and the sample prefiltered through a 0.45 um PTFE syringe filter. Molecular weight averages were determined relative to a calibration curve ($4^{th}$ order) created using polydimethylsiloxane (PDMS) standards covering the molecular weight range of 1300-850,000.

Silicon 29 Nuclear Magnetic Spectroscopy ($^{29}$Si NMR) $^{29}$Si NMR data was collected on a Varian Mercury 300 using chloroform D solvent. The experiment was conducted with a relaxation delay of 60 sec with a gated decoupled pulse sequence using a 5 mm switchable PFG probe was used. Alternatively, the sample was run on a Mercury 400 using a Nalorac 16 mm silicon free Pulsetune® probe with 0.03 M Cr(acac)$_3$ as a relaxation reagent and gated decoupling to ensure quantitative conditions. Both used 90 degree pulsewidth and the 400 used a 12 sec relaxation delay.

SiH Measurement—The material was measured out (according to estimated SiH content) in 125 mL Erlenmeyer flask to nearest 0.01 grams and sample weight recorded. To this was added 20 mL of prepared mercuric acetate solution (4% mercury acetate powder, 96% (1:1 mixture) methanol/chloroform), the flask was then covered and swirled to mix. A blank sample (no SiH containing material added) was also prepared for comparision. After samples stood for 30 minutes, they were quenched with 20 mL of prepared calcium chloride solution (25% calcium chloride, 75% methanol). Then 10 drops of prepared phenolphthalein solution (1% phenolphthalein in ethanol) from small pipet was added. The samples were then titrated with 0.1N methanolic potassium hydroxide and measurements taken.

Bath life Measurement—Viscosity was measured on a Brookfield DV-II+ spindle viscometer or DV-II cone and plate viscometer using the appropriate spindle and spindle speed for the viscosity range of the formulation being measured. Bath life is defined as the time it takes a fully formulated coating composition to double in viscosity at 40° C.

Measurement of Cure—To measure cure based on percent extractable silicone, a sample of silicone coated substrate was taken in the form of a circular disk. After obtaining an initial coat weight measurement on the sample by X-ray fluorescence (XRF) on an Oxford Lab-X 3000 Benchtop XRF Analyzer, it was submerged in methylisobutyl ketone (MIBK), with agitation, for 30 minutes. After MIBK extraction, the sample was removed from the MIBK solvent, allowed to air dry and a second coat weight measurement acquired. The percent extractable silicone is defined as the percent loss in silicone coat weight.

Preparation of Organohydrogensilicon Compounds

EXAMPLE 1

To a reaction vessel was added 2947 g of a poly(methylhydrogen) cyclic siloxane (MeH cyclics) having an average Dp of about 4.4 (49.1 moles SiH) and 5053 g of a dimethylvinylsiloxy end-blocked polydimethylsiloxane polymer having an average Dp of about 8 (14.4 moles vinyl) to give an SiH/SiVi ratio of 3.4:1. The polymers were well mixed and a vinylsiloxane diluted platinum (Pt) catalyst added to give a Pt content of about 12 ppm. An exothermic reaction was initiated and over a period of 10 minutes the temperature of the vessel contents rose from 25° C. to 137° C. After cooling for 2 hours, bis(2-methoxy-1-methylethyl) maleate (80 g, 1 wt %) was added to stabilize the Pt from further activity. The resulting polymer was not stripped and was shown by GC to have a remaining unreacted MeH cyclics content of about 4%. The isolated product had a viscosity of 78 mPa·s, a SiH level of 0.42 wt % (SiH as H) as determined by titration and a GPC Mn 2810 and Mw=8115 vs polydimethylsiloxane (PDMS) standards. $^{29}$Si NMR analysis of the product demonstrated that all vinyl functionality has been consumed yielding silethylene bridges, no ring opening has occurred and that the resulting molecular structure is consistent with a methylhydrogen cyclic siloxane capped linear siloxane polymer as described below, where Me is methyl, x is an average of 6.5 for Mw and an average of 1.5 for Mn and d is an average of about 8.

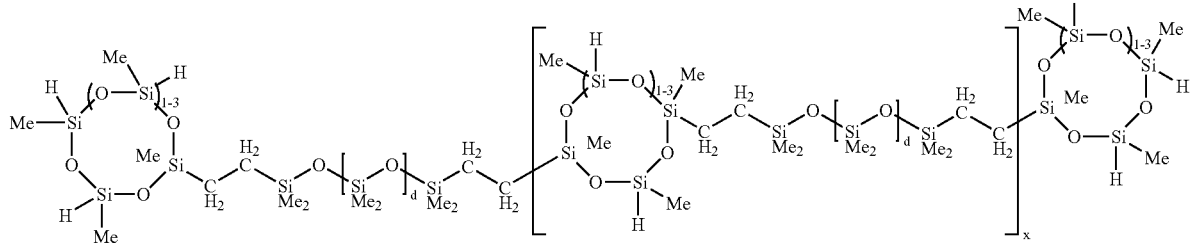

EXAMPLE 2

To a reaction vessel was added 5211 g of a poly(methylhydrogen) cyclic siloxane (MeH cyclics) having an average degree of polymerization (Dp) of about 4.4 (86.7 moles SiH) and 3340 g of a dimethylvinylsiloxy end-blocked polydimethylsiloxane having an average Dp of about 8 (9.6 moles vinyl) to give an SiH/SiVi ratio of 9:1. The polymers were well mixed and a vinylsiloxane diluted platinum (Pt) catalyst added to give a Pt content of about 12 ppm. An exothermic reaction was initiated and over a period of 10 minutes the temperature of the vessel contents rose from 23° C. to 100° C. After cooling for 30 minutes, bis(2-methoxy-1-methylethyl)maleate (60 g, 0.7 wt %) was added to stabilize the Pt from further activity. The resulting product was stripped on a roto-vap at 1 mm Hg and 50° C. to remove unreacted poly(methylhydrogen) cyclic siloxane. The isolated product had a viscosity of 23 mPa·s, a SiH level of 0.58 wt % (SiH as H) as determined by titration and a GPC Mn=1396 and Mw=2753 vs PDMS standards. $^{29}$Si NMR analysis of the crosslinker product demonstrated that all vinyl functionality has been consumed yielding silethylene bridges, no ring opening has occurred and that the resulting molecular structure is consistent with a methylhydrogen cyclic siloxane capped linear siloxane polymer, where Me is methyl, x is an average of 1.5 for Mw and average of 0 for Mn, and d is an average of about 8.

EXAMPLE 4

To a reaction vessel was added 312 g of a poly(methylhydrogen) cyclosiloxane having an average Dp of about 4.4

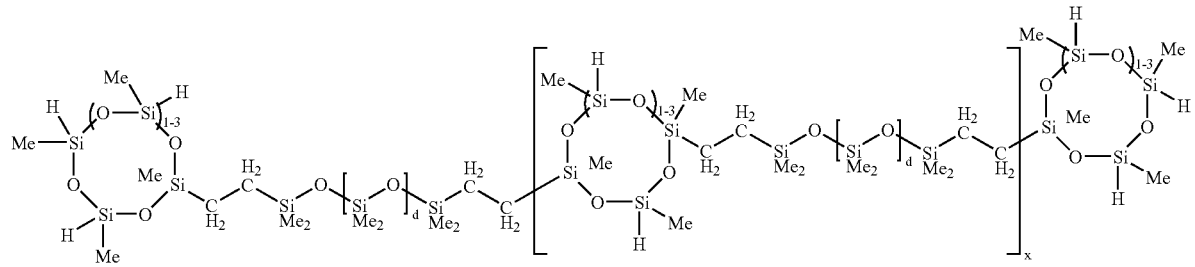

EXAMPLE 3

To a reaction vessel was added 11.1 g of a poly(methylhydrogen) cyclosiloxane having an average Dp of about 4.4 and 50 g of a dimethylvinylsiloxy end-blocked polydimethylsiloxane polymer having an average Dp of about 25 to give an SiH/SiVi ratio of 3.5:1. The polymers were well mixed and a vinylsiloxane diluted Pt catalyst added to give a Pt content of about 10 ppm. The typical and expected exothermic reaction was observed. The resulting product was not stripped and was used immediately for performance evaluation without the Pt being deactivated. Titration showed that the product had an SiH level of 0.20 wt % (SiH as H). $^{29}$Si NMR analysis of the product would demonstrate that all vinyl functionality has been consumed yielding silethylene bridges, no ring opening has occurred and that the resulting molecular structure is consistent with a methylhydrogen cyclic siloxane capped linear siloxane polymer as described below, where Me is methyl, x is an average of 6.5 for Mw and an average of 1.5 for Mn and d is an average of about 8.

(5.2 mol SiH) and 3000 g of a dimethylvinylsiloxy end-blocked polydimethylsiloxane polymer having an average Dp of about 60 (1.5 mol Vi) to give an SiH/SiVi ratio of 3.5:1. The polymers were well mixed and a vinylsiloxane diluted Pt catalyst added to give a Pt content of about 10 ppm. The typical and expected exothermic reaction was observed. After cooling for 3 hours, bis(2-methoxy-1-methylethyl)maleate (0.3% by weight, 9.9 g) was added to deactivate the Pt. The resulting polymer was isolated without stripping and gave a polymer of 1350 cP with a SiH content of 0.09 wt % (SiH as H). $^{29}$Si NMR analysis of the product would demonstrate that all vinyl functionality has been consumed yielding silethylene bridges, no ring opening has occurred and that the resulting molecular structure is consistent with a methylhydrogen cyclic siloxane capped linear siloxane polymer as described below, where Me is methyl, x is an average of 6.5 for Mw and an average of 1.5 for Mn and d is an average of about 8.

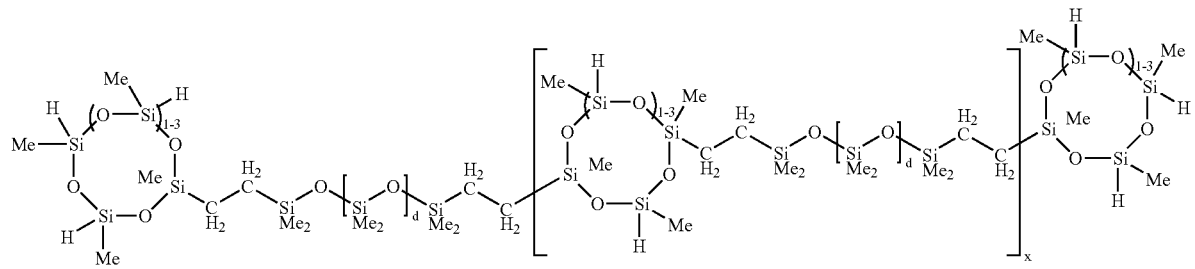

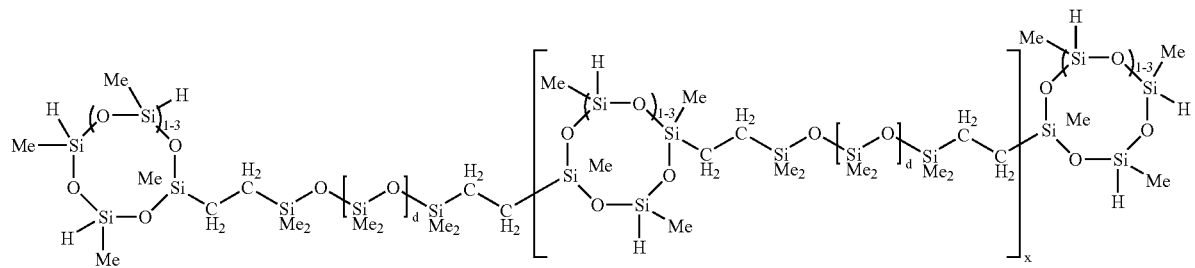

EXAMPLE 5

EXAMPLE 6

To a reaction vessel was added 20.1 g of a poly(methylhydrogen) cyclosiloxane having an average Dp of about 4.4 (0.3 mol SiH) and 50 g of a dimethylvinylsiloxy endblocked polydimethylsiloxane polymer having an average Dp of about 60 (0.02 mol Vi) to give an SiH/SiVi ratio of 15:1. The polymers were well mixed and a vinylsiloxane diluted Pt catalyst added to give a Pt content of about 10 ppm. The typical and expected exothermic reaction was observed. The resulting polymer was stripped on a rotary evaporator to remove volatiles and was used immediately for performance evaluation without the Pt being deactivated. Titration showed that the product had an SiH level of 0.14 wt % (SiH as H). $^{29}$Si NMR analysis of the product would demonstrate that all vinyl functionality has been consumed yielding silethylene bridges, no ring opening has occurred and that the resulting molecular structure is consistent with a methylhydrogen cyclic siloxane capped linear siloxane polymer, where Me is methyl, x is an average of 1.5 for Mw and average of 0 for Mn, and d is an average of about 8.

To a reaction vessel was added 297.1 g of a poly (methylhydrogen) cyclic siloxane (MeH cyclics) having an average Dp of about 4.4 (5.0 moles of SiH) and 155.3 g of a vinyl endblocked polmer having an average Dp of about 25 (0.15 moles vinyl) to give a SiH/SiVi ratio of 33:1. The polymers were well mixed and a vinylsiloxane diluted Platinum (Pt) catalyst added to give a Pt content of about 12 ppm. The exothermic reaction resulted in a small to moderate temperature increase. After allowing the sample to cool for a few hours, bis(2-methoxy-1-methylethyl)maleate (0.4 g, 1 wt %.) was added to stabilize the Pt from further activity. The resulting polymer was stripped on a rotovap at 1 mm Hg and 50 degrees Celsius to remove any unreacted MeH cyclics. The isolated product had a viscosity of 49 mPa·s, a SiH level of 0.28 wt % (SiH as H) as determined by titration and molecular weight as measured by GPC of Mn=2518 and Mw=33550 versus polydimethylsiloxane (PDMS) standards. $^{29}$Si and $^{13}$C NMR analysis of the product demon-

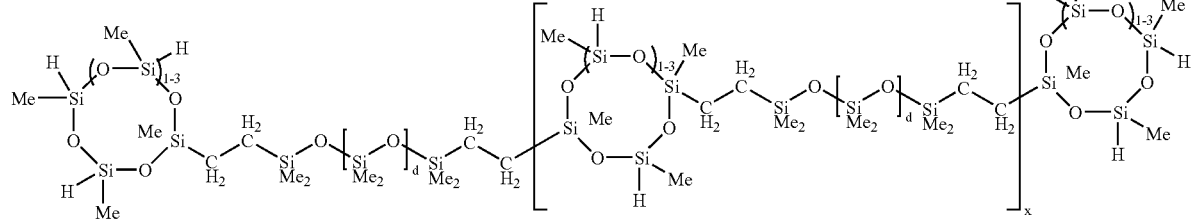

strated that all vinyl functionality has been consumed yielding silethylene bridges, no ring opening had occurred and that the resulting molecular structure is consistent with a methylhydrogen cyclic siloxane capped linear siloxane polymer as described below, where Me is methyl, x corresponds to 10 for Mw, 0 for Mn and d is an average of about 25.

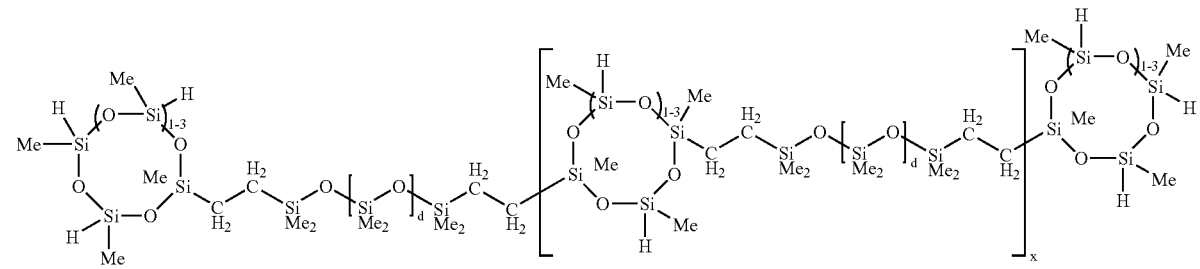

EXAMPLE 7

To a reaction vessel was added 279.0 g of a poly (methylhydrogen) cyclic siloxane (MeH cyclics) having an average Dp of about 4.4 (4.7 moles of SiH) and 175.0 g of 30 dp OH— endblocked polymer (0.16 mol OH) to give an SiH/SiOH ratio of 30:1. The polymers were well mixed and a vinylsiloxane diluted Platinum (Pt) catalyst added to give a Pt content of about 12 ppm. The exothermic reaction resulted in a small to moderate temperature increase. After allowing the sample to cool for a few hours, bis(2-methoxy-1-methylethyl)maleate (0.40 g, 1 wt %) was added to stabilize the Pt from further activity. The resulting polymer was stripped on a rotovap at 1 mm Hg and 50 degrees Celsius to remove any unreacted poly(methylhydrogen) cyclic siloxane. The isolated product had a viscosity of 422 mPa·s, a SiH level of 0.22 wt % (SiH as H) as determined by titration and a molecular weight as determined by GPC of Mn=5510 and Mw=65260 vs. polydimethylsiloxane (PDMS) standards. $^{29}$Si and $^{13}$C NMR analysis of the product demonstrated that all OH functionality had been consumed yielding $SiO_{3/2}$ structural units (T), no ring opening had occurred and that the resulting molecular structure is consistent with a methylhydrogen cyclic siloxane capped linear siloxane polymer as described below, where Me is methyl, x is an average of 18 for Mw, an average of 1.5 for Mn and d is an average of about 30.

EXAMPLE 8

To a reaction vessel was added 272.6 g of a poly (methylhydrogen) cyclic siloxane (MeH cyclics) having an average Dp of about 4.4 (4.5 moles of SiH) and 175.0 g of a vinyldimethylsiloxy endblocked poly(dimethylsiloxane-silicate) copolymer having an average dp of 100 (0.093 mol vinyl) to give an SiH/SiVi ratio of 49:1. The polymers were well mixed and a vinylsiloxane diluted Platinum (Pt) catalyst added to give a Pt content of about 12 ppm. The exothermic reaction resulted in a small to moderate temperature increase. After allowing the sample to cool for a few hours, bis(2-methoxy-1-methylethyl)maleate (0.39 g, 1 wt %) was added to stabilize the Pt from further activity. The resulting polymer was stripped on a rotovap at 1 mm Hg and 50 degrees Celsius to remove any unreacted MeH cyclics. The isolated product had a viscosity of 263 mPa·s, a SiH level of 0.15 wt % (SiH as H) as determined by titration and a molecular weight as determined by GPC of Mn=5615 and Mw=30030 vs. polydimethylsiloxane (PDMS) standards. $^{29}$Si and $^{13}$C NMR analysis of the product demonstrates that all vinyl functionality had been consumed yielding silethylene bridges, no ring opening had occurred and that the resulting nominal Mn molecular structure is consistent with a methylhydrogen cyclic siloxane capped siloxane polymer as described below, where Me is methyl and d is about 25. Oligomers of this structure can of course grow from any or all of the arms.

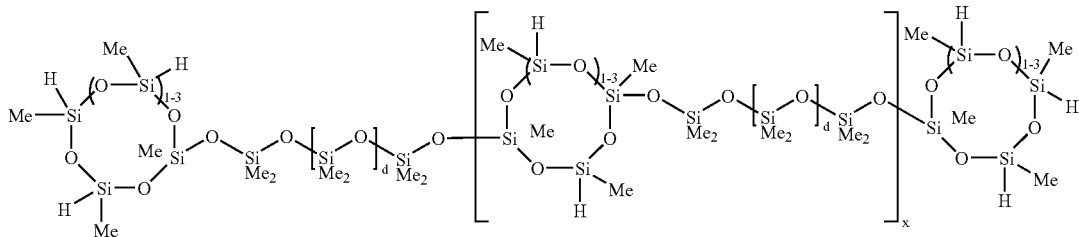

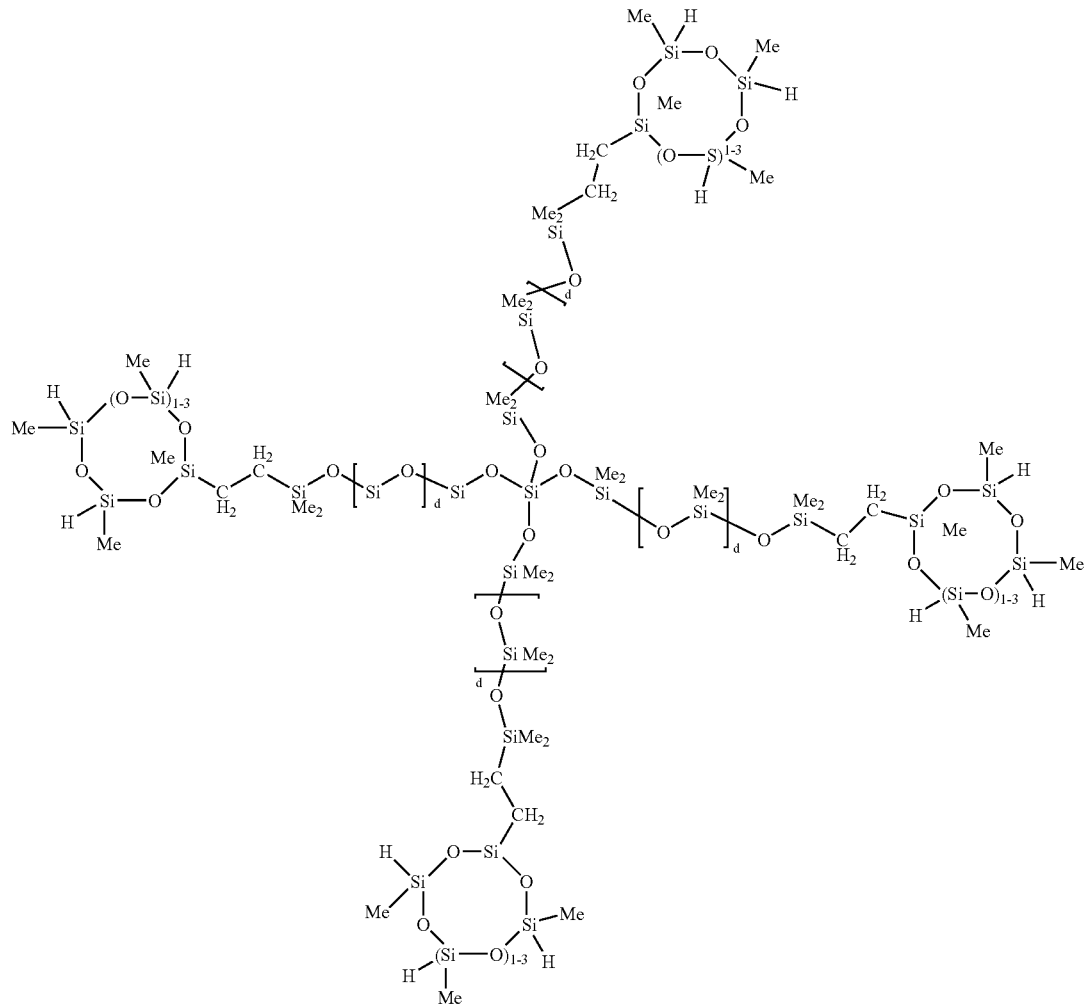

EXAMPLE 9

To a reaction vessel was added 238.2 g of a poly (methylhydrogen) cyclic siloxane (MeH cyclics) having an average Dp of about 4.4 (4.0 moles of SiH) and 175.0 g of an endblocked and vinyl pendant polydimethylsiloxane copolymer (0.08 mol vinyl) to give an SiH/SiVi ratio of 50:1. The polymers were well mixed and a vinylsiloxane diluted Platinum (Pt) catalyst added to give a Pt content of about 12 ppm. The exothermic reaction resulted in a small to moderate temperature increase. After allowing the sample to cool for a few hours, bis(2-methoxy-1-methylethyl)maleate (0.39 g, 1 wt %) was added to stabilize the Pt from further activity. The resulting polymer was stripped on a rotovap at 1 mm Hg and 50 degrees Celsius to remove any unreacted MeH cyclics. The isolated product had a viscosity of 295 mPa·s, a SiH level of 0.15 wt % (SiH as H) as determined by titration and a molecular weight as measured by GPC of Mn=6872 and Mw 21960 vs. polydimethylsiloxane (PDMS) standards. $^{29}$Si and $^{13}$C NMR analysis of the product demonstrates that all vinyl functionality had been consumed yielding silethylene bridges, no ring opening had occurred and that the resulting nominal Mn molecular structure is consistent with a methylhydrogen cyclic siloxane capped pendant and endblocked PDMS siloxane polymer as described below, where Me is methyl, $d_1$ is about 97 and $d_2$ is about 1.3. Oligomers of this structure can grow from the endblocked or pendant arms.

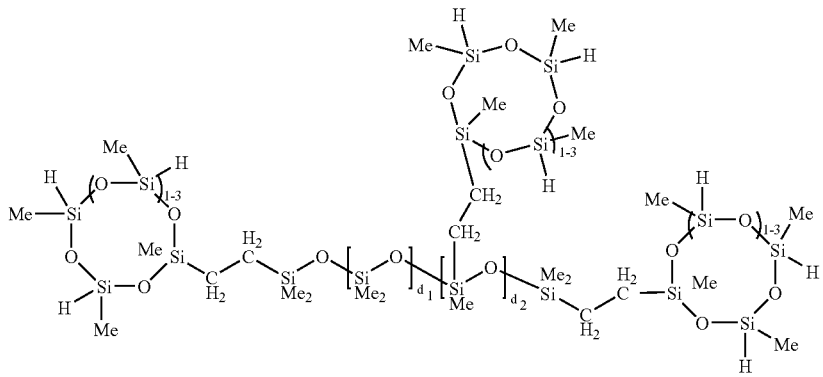

EXAMPLE 10

To a reaction vessel was added 236.1 g of a poly (methylhydrogen) cyclic siloxane (MeH cyclics) having an average Dp of about 4.4 (3.9 moles of SiH) and 175.0 g of an endblocked and hexenyl pendant polydimethylsiloxane copolymer (0.076 mol vinyl) to give an SiH/SiVi ratio of 52:1. The polymers were well mixed and a vinylsiloxane diluted Platinum (Pt) catalyst added to give a Pt content of about 12 ppm. The exothermic reaction resulted in a small to moderate temperature increase. After allowing the sample to cool for a few hours, bis(2-methoxy-1-methylethyl)maleate (0.39 g, 1 wt %) was added to stabilize the Pt from further activity. The resulting polymer was stripped on a rotovap at 1 mm Hg and 50 degrees Celsius to remove any unreacted poly(methylhydrogen) cyclic siloxane. The isolated product had a viscosity of 284 mPa·s, a SiH level of 0.17 wt % (SiH as H) as determined by titration and a molecular weight as determined by GPC of Mn=4282 and Mw=17290 vs. polydimethylsiloxane (PDMS) standards. $^{29}$Si and $^{13}$C NMR analysis of the product demonstrated that all vinyl functionality had been consumed yielding silethylene bridges, no ring opening had occurred and that the resulting nominal Mn molecular structure is consistent with a methylhydrogen cyclic siloxane capped endblocked and pendant siloxane polymer as described below, where Me is methyl, $d_1$ is about 97 and $d_2$ is about 1.3.

EXAMPLE 11

To a reaction vessel was added 289.7 g of a poly (methylhydrogen) cyclic siloxane (MeH cyclics) having an average Dp of about 4.4 (4.8 moles of SiH) and 175.0 g of a trimethylsiloxy endblocked, vinyl pendant polydimethylsiloxane copolymer having an average Dp of about 165 (0.089 mol vinyl) to give an SiH/SiVi ratio of 54:1. The polymers were well mixed and a vinylsiloxane diluted Platinum (Pt) catalyst added to give a Pt content of about 12 ppm. The exothermic reaction resulted in a small to moderate temperature increase. After allowing the sample to cool for a few hours, bis(2-methoxy-1-methylethyl)maleate (0.40 g, 1 wt %) was added to stabilize the Pt from further activity. The resulting polymer was stripped on a rotovap at 1 mm Hg and 50 degrees Celsius to remove any unreacted poly(methylhydrogen) cyclics; The isolated product had a viscosity of 1020 mPa·s, a SiH level of 0.19 wt % (SiH as H) as determined by titration and a molecular weight as determined by GPC of Mn=8902 and Mw=60370 vs polydimethylsiloxane (PDMS) standards. $^{29}$Si and $^{13}$C NMR analysis of the product demonstrates that all vinyl functionality had been consumed yielding silethylene bridges, no ring opening had occurred and that the resulting nominal Mn molecular structure is consistent with a methylhydrogen cyclic siloxane capped vinyl pendant siloxane polymer as described below, where Me is methyl, $d_1$ is about 157 and $d_2$ is about 6.

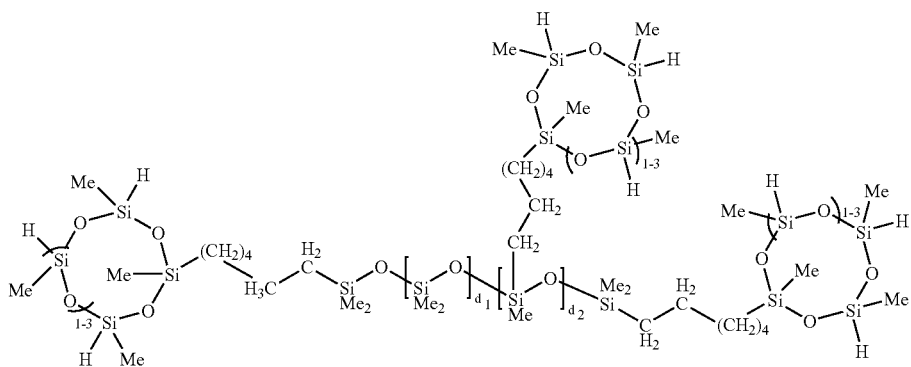

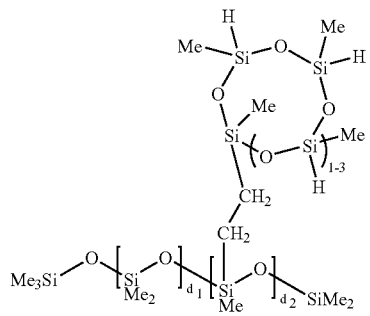

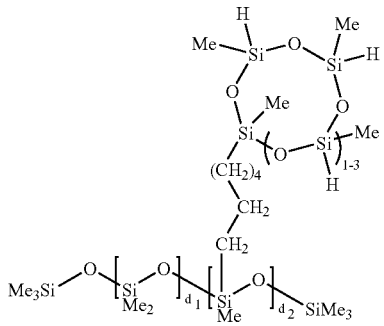

EXAMPLE 12

EXAMPLE 13

To a reaction vessel was added 233.9 g of a poly (methylhydrogen) cyclic siloxane (MeH cyclics) having an average Dp of about 4.4 (3.9 moles of SiH) and 175.0 g of a trimethylsiloxy endblocked, hexenyl pendant polydimethylsiloxane copolymer (0.076 mol vinyl) to give an SiH/SiVi ratio of 51:1. The polymers were well mixed and a vinylsiloxane diluted Platinum (Pt) catalyst added to give a Pt content of about 12 ppm. The exothermic reaction resulted in a small to moderate temperature increase. After allowing the sample to cool for a few hours, bis(2-methoxy-1-methylethyl)maleate (0.39 g, 1 wt %) was added to stabilize the Pt from further activity. The resulting polymer was stripped on a rotovap at 1 mm Hg and 50 degrees Celsius to remove any unreacted poly(methylhydrogen) cyclic. The isolated product had a viscosity of 585 mPa·s, a SiH level of 0.15 wt % (SiH as H) as determined by titration and a molecular weight as determined by GPC of Mn=7930 and Mw=50100 vs polydimethylsiloxane (PDMS) standards. $^{29}$Si and $^{13}$C NMR analysis of the product demonstrated that all vinyl functionality had been consumed yielding silethylene bridges, no ring opening had occurred and that the resulting nominal Mn molecular structure is consistent with a methylhydrogen cyclic siloxane capped pendant siloxane polymer as described below, where Me is methyl, $d_1$ is about 143 and $d_2$ is about 5.

To a reaction vessel was added 654.0 g of a poly (methylhydrogen) cyclic siloxane (MeH cyclics) having an average Dp of about 4.4 (6.9 moles of SiH) and 110.0 g of a hexenyl endblocked polydimethylsiloxane polymer (0.25 mol vinyl) to give an SiH/SiVi ratio of 44:1. The polymers were well mixed and a vinylsiloxane diluted Platinum (Pt) catalyst added to give a Pt content of about 12 ppm. The exothermic reaction resulted in a small to moderate temperature increase. After allowing the sample to cool for a few hours, bis(2-methoxy-1-methylethyl)maleate (0.39 g, 1 wt %) was added to stabilize the Pt from further activity. The resulting polymer was stripped on a rotovap at 1 mm Hg and 50 degrees Celsius to remove any unreacted poly(methylhydrogen) cyclic siloxane. The isolated product had a viscosity of 29 mPa·s, a SiH level of 0.50 wt % (SiH as H) as determined by titration and a molecular weight as determined by GPC of Mn=1648 and Mw=16060 vs polydimethylsiloxane (PDMS) standards. $^{29}$Si and $^{13}$C NMR analysis of the product demonstrated that all vinyl functionality has been consumed yielding silethylene bridges, no ring openings had occurred and that the resulting molecular structure is consistent with a methylhydrogen cyclic siloxane capped linear siloxane polymer as described below, where Me is methyl, x corresponds to 8 for Mw, 0 for Mn and d is an average of about 10.

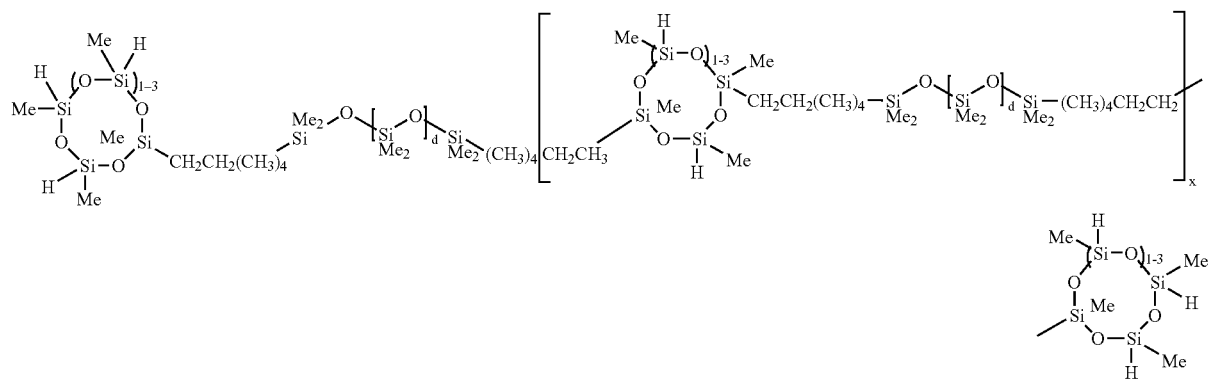

EXAMPLE 14

To a reaction vessel was added 837.0 g of a poly (methylhydrogen) cyclic siloxane (MeH cyclics) having an average Dp of about 4.4 (14.0 moles of SiH) and 65.0 g of tetrakis(vinyldimethylsiloxy)silane (0.60 mol vinyl) to give an SiH/SiVi ratio of 23:1. The polymers were well mixed and a vinylsiloxane diluted Platinum (Pt) catalyst added to give a Pt content of about 12 ppm. The exothermic reaction resulted in a small to moderate temperature increase. After allowing the sample to cool for a few hours, bis(2-methoxy-1-methylethyl)maleate (0.40 g, wt %) was added to stabilize the Pt from further activity. The resulting polymer was stripped on a rotovap at 1 mm Hg and 50 degrees Celsius to remove any unreacted poly(methylhydrogen) cyclic siloxane. The isolated product had a viscosity of 81 mPa·s, a SiH level of 0.90 wt % (SiH as H) as determined by titration and a molecular weight as determined by GPC of Mn=1460 and Mw=18600 vs polydimethylsiloxane (PDMS) standards. $^{29}$Si and $^{13}$C NMR analysis of the product demonstrated that all vinyl functionality has been consumed yielding silethylene bridges, no ring opening had occurred and that the resulting nominal molecular structure for Mn is consistent with a methylhydrogen cyclic siloxane capped siloxane polymer as described below, where Me is methyl. Higher oligomers can grow from any of the branches.

To a reaction vessel was added 729.7 g of a poly (methylhydrogen) cyclic siloxane (MeH cyclics) having an average Dp of about 4.4 (12.2 moles of SiH) and 85.0 g of tetrakis(hexenyldimethylsiloxy)silane (0.52 mol vinyl) to give an SiH/SiVi ratio of 24:1. The polymers were well mixed and a vinylsiloxane diluted Platinum (Pt) catalyst added to give a Pt content of about 12 ppm. The exothermic reaction resulted in a small to moderate temperature increase. After allowing the sample to cool for a few hours, bis(2-methoxy-1-methylethyl)maleate (0.40 g, wt %) was added to stabilize the Pt from further activity. The resulting polymer was stripped on a rotovap at 1 mm Hg and 50 degrees Celsius to remove any unreacted poly(methylhydrogen) cyclic. The isolated product had a viscosity of 32 mPa·s, a SiH level of 0.70 wt % (SiH as H) as determined by titration and a molecular weight as determined by GPC of Mn=1453 and Mw=27690 vs polydimethylsiloxane (PDMS) standards. $^{29}$Si and $^{13}$C NMR analysis of the product demonstrated that all vinyl functionality has been consumed yielding silethylene bridges, no ring opening had occurred and that the resulting nominal molecular structure for Mn is consistent with a methylhydrogen cyclic siloxane capped siloxane polymer as described below, where Me is methyl. Higher oligomers can grow from any of the branches.

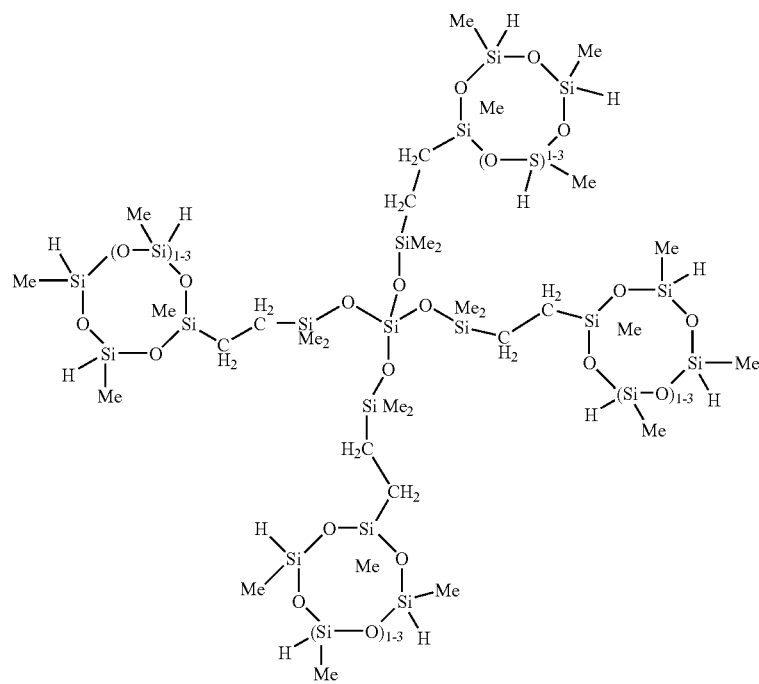

EXAMPLE 15

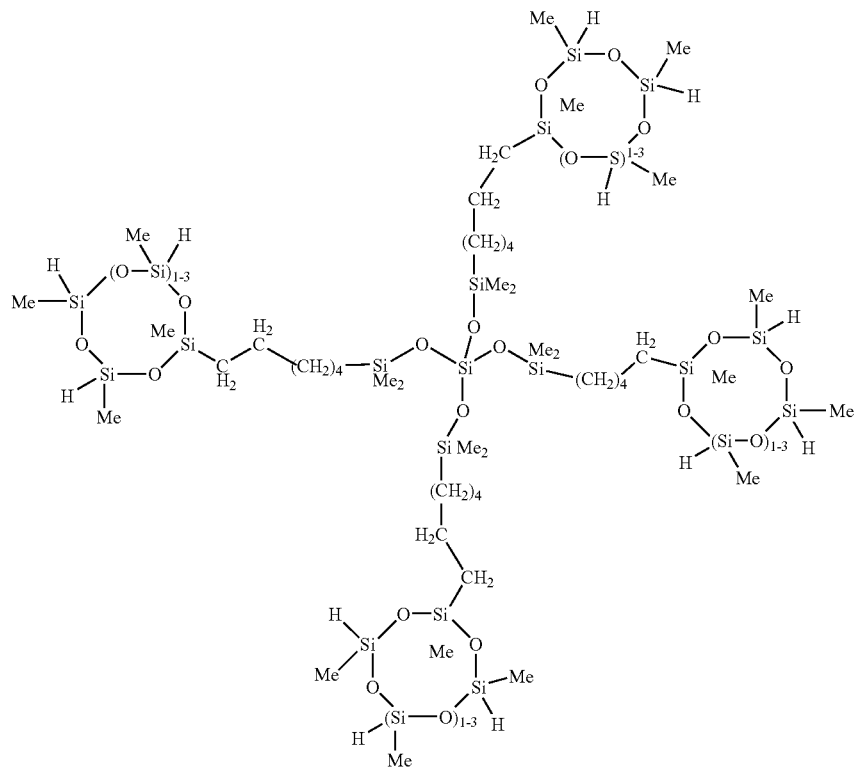

EXAMPLE 16

To a reaction vessel was added 381.1 g of a poly(methylhydrogen) cyclic siloxane (MeH cyclics) having an average Dp of about 4.4 (6.3 moles SiH) and 80.0 g of a dimethylvinylsiloxy end-blocked polydimethylsiloxane polymer having an average Dp of about 7 (0.29 moles vinyl) to give an SiH/SiVi ratio of about 22:1. The polymers were well mixed and a vinylsiloxane diluted platinum (Pt) catalyst was added to give a Pt content of about 4 ppm. An exotherm reaction was initiated and over a period of 10 minutes the temperature of the vessel contents rose to above room temperature. After cooling for 2 hours, the resulting polymer was stripped in a rotovap at 1 mm Hg and 95 C to remove any unreacted poly(methylhydrogen) cyclic siloxane. The material was then allowed to cool to room temperature. After cooling, 150 g of above product was added to another reaction vessel. Then 24.3 g (0.29 moles vinyl) of 1-hexene was slowly added to the reaction vessel. An exothermic reaction was initiated with each small addition. After cooling for 2 hours, bis(2-methoxy-1-methylethyl)maleate (0.87 g, 0.5 wt %) was added to stabilize the Pt from further activity. The resulting polymer was then stripped a second time in a rotovap at 1 mm Hg and 95 C to remove any unreacted 1-hexene. After cooling to room temperature, bis(2-methoxy-1-methylethyl)maleate (0.87 g, 0.5 wt %) was added to stabilize the Pt from further activity. The material was then allowed to cool to room temperature. The isolated product had a viscosity of 62 mPa·s, a SiH level of 0.32% (SiH as H) as determined by titration and a GPC Mn=1723 and Mw=15640 versus polydimethylsiloxane (PDMS) standards. $^{29}$Si NMR analysis of the product demonstrates that all vinyl functionality has been consumed yielding silethylene bridges, no ring openings has occurred and that the resulting molecular structure is consistent with a methylhydrogen cyclic siloxane capped linear siloxane polymer as described below, where x is about 1 for Mn, about 9 for Mw and d is an average of about 7.

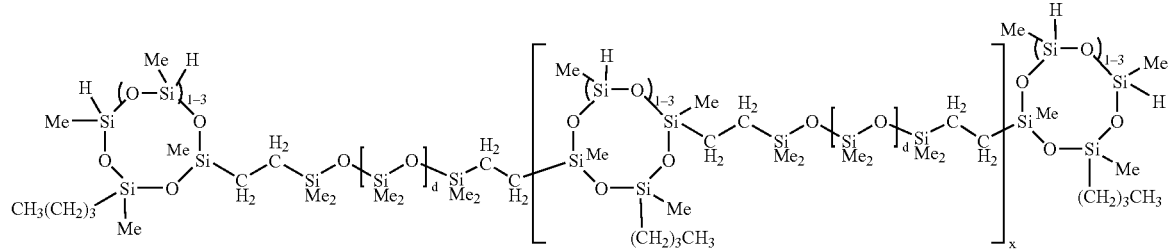

EXAMPLE 17

To a reaction vessel was added 737 g of a poly(methylhydrogen) cyclic siloxane (MeH cyclics) having an average Dp of about 4.4 (12.2 moles SiH) and 1263 g of a dimethylvinylsiloxy end-blocked polydimethylsiloxane polymer having an average Dp of about 8 (3.6 moles vinyl) to give an SiH/SiVi ratio of 3.4:1. The polymers were well mixed and a vinylsiloxane diluted platinum (Pt) catalyst added to give a Pt content of about 4 ppm. An exothermic reaction was initiated and over a period of 10 minutes the temperature of the vessel contents rose from 25° C. to 137° C. After the reaction mixture had cooled to 25 C, 91.1 g (0.80 mol) allylglycidylether (AGE) was added. The reaction was then heated via heating mantle to 50 C at which point the heat was turned off. The reaction mixture continued to exotherm to 66 C over 5 minutes and held steady at 66 C for an additional 5 minutes. Analysis by gas chromatography at this point showed no trace of the AGE raw material. When the temperature began to drop, the heat was turned back on and the reaction mixture was maintained at 80 C for 2 hours. The reaction was then allowd to cool to 25 C. To stabilize the product, 4.2 g (0.2 wt. %) bis(2-methoxy-1-methylethyl) maleate was then added. The isolated product had a viscosity of 93 mPa·s, a SiH level of 0.36% (SiH as H) as determined by titration and a GPC Mn=2626 and Mw=6405 versus polydimethylsiloxane (PDMS) standards. The structure is shown below, where 10% of the SiH functions have been replaced with a propylglycidylether group, x=1-5 and d=about 8.

EXAMPLE 18

To a reaction vessel was added 737.0 g of a poly(methylhydrogen) cyclic siloxane (MeH cyclics) having an average Dp of about 4.4 (12.2 moles SiH) and 1263.0 g of a dimethylvinylsiloxy end-blocked polydimethylsiloxane polymer having an average Dp of about 8 (3.6 moles vinyl) to give an SiH/SiVi ratio of 3.4:1. The polymers were well mixed and a vinylsiloxane diluted platinum (Pt) catalyst added to give a Pt content of about 4 ppm. An exothermic reaction was initiated and over a period of 10 minutes the temperature of the vessel contents rose from 25° C. to 137° C. After the reaction mixture had cooled to 25 C, 227.9 g (2.0 mol) AGE was added. The reaction was then heated via heating mantle to 50 C at which point the heat was turned off. The reaction mixture continued to exotherm to 91 C over 10 minutes. Analysis by gas chromatography at this point showed no trace of the AGE raw material. When the reaction temperature had dropped back to 80 C, the heat was turned back on and the reaction mixture was maintained at 80 C for 2 hours. The reaction was then allowd to cool to 25 C. To stabilize the product, 4.2 g (0.2 wt. %) bis(2-methoxy-1-methylethyl)maleate was then added. The isolated product had a viscosity of 85 mPa·s, a SiH level of 0.30% (SiH as H) as determined by titration and a GPC Mn=2867 and Mw=7561 versus polydimethylsiloxane (PDMS) standards. The structure is shown below, where 25% of the SiH functions have been replaced with a propylglycidylether group, x=1-5 and d=about 8.

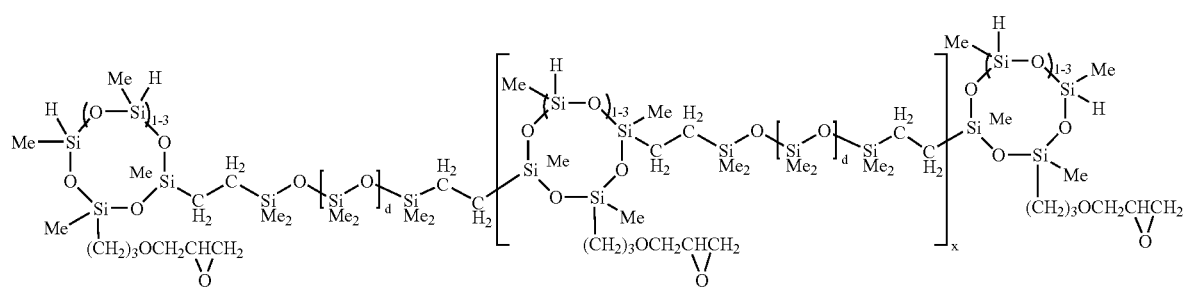

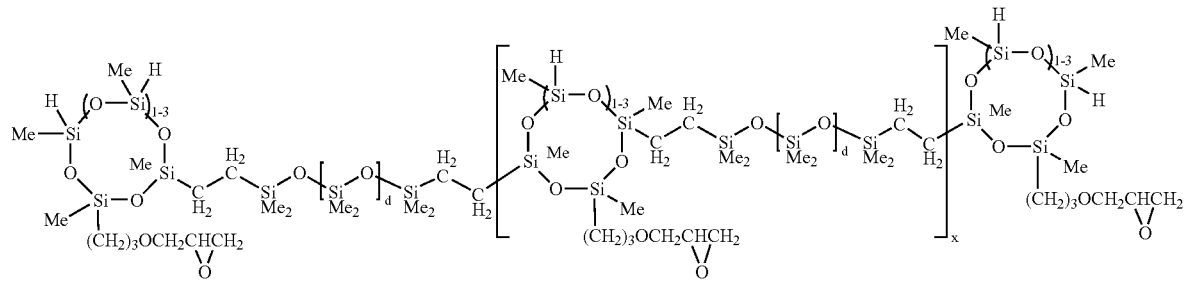

Preparation of Coatings

Coatings were formulated at a 1.6:1 SiH:Vi ratio using vinylsiloxane diluted platinum (Pt) (catalyst), bis (2-methoxy-1-methylethyl) maleate (inhibitor), a dimethylvinylsiloxy end-blocked polydimethylsiloxane (PDMS) polymer with an average degree of polymerization of 130 (P-1), and either a organohydrogensilicon compound crosslinker prepared via Examples 1-18 or a comparative crosslinker selected from (C-1) a trimethylsiloxy end-blocked polydimethylsiloxane-methylhydrogensiloxane copolymer having a total average degree of polymerization of about 40 with about 70 mol % methylhydrogen moiety on the siloxane chain or (C-2) a trimethylsiloxy end-blocked poly(methylhydrogen) siloxane polymer having a total average degree of polymerization of about 20. The formulations were prepared by mixing the dimethylvinylsiloxy end-blocked polydimethylsiloxane (PDMS) polymer, the SiH containing material and the inhibitor in a jar and then adding the platinum catalyst with mixing to form each coating formulation. Each formulation was then coated onto paper at a thickness of approximately 1.5 microns, as measured by X-ray fluorescence (XRF) on an Oxford Lab-X3000 Benchtop XRF Analyzer, and cured on a moving web at a temperature of 300° F. for 6 sec. Amounts of catalyst and inhibitor used and bath life measurements are provided in Table 1 and cure comparison measurements are found in Table 2.

TABLE 1

Bath life Comparison of Coatings

| Platinum Level (ppm) | 100 | 100 | 60 | 20 | 20 |
|---|---|---|---|---|---|
| Inhibitor Level (%) | 0.1 | 0.7 | 0.4 | 0.1 | 0.7 |
| Bath Life (hours) with Crosslinker from: | | | | | |
| Example 1 | 58 | 340 | 360 | 230 | 1350 |
| C-1* | 0.06 | 22 | 10 | 1.1 | 104 |
| C-2* | 0.05 | 14 | 6 | 0.8 | 105 |
| Example 6 | 14 | | | | |
| Example 7 | 0.33 | | | | |
| Example 8 | 14 | | | | |
| Example 9 | 14 | | | | |
| Example 10 | 14 | | | | |
| Example 11 | 0.25 | | | | |
| Example 12 | 5 | | | | |
| Example 13 | 5 | | | | |
| Example 14 | 0.5 | | | | |
| Example 15 | 6 | | | | |
| Example 16 | 12 | | | | |
| Example 17 | 1.0 | | | | |
| Example 18 | 5.4 | | | | |

*comparative

TABLE 2

Cure Comparison of Coatings

| Platinum Level (ppm) | 100 | 60 | 20 | 20 | 20 | 10 | 5 |
|---|---|---|---|---|---|---|---|
| Inhibitor Level (%) | 0.7 | 0.4 | 0.1 | 0.4 | 0.7 | 0.4 | 0.4 |
| % Extractable Silicone with Crosslinker from: | | | | | | | |
| Example 1 | 3 | 4 | 4 | 3 | 4 | 2 | 6 |
| Example 2 | | | | 3 | 5 | 4 | |
| Example 3 | | | | | | 2 | 4 |
| Example 4 | | | | | | 2 | 2 |
| Example 5 | | | | | | 3 | 17 |
| Example 6 | | | | 2 | | 4 | 42 |
| Example 7 | | | | | | 2 | 10 |
| Example 8 | | | | 2 | | 4 | 20 |
| Example 9 | | | | | 3 | 8 | |
| Example 10 | | | | 2 | | 8 | |
| Example 11 | | | | | 4 | 10 | |
| Example 12 | | | | | 4 | 6 | |
| Example 13 | | | | | 4 | 14 | |
| Example 14 | | | | | 7 | 25 | |
| Example 15 | | | | | 3 | 9 | |
| Example 16 | | | | | 4 | 4 | 8 |
| Example 17 | | | | | 3 | | |
| Example 18 | | | | | 2 | | |
| C-1* | 3 | 4 | 4 | | 8 | 12 | 40 |
| C-2* | 3 | 5 | 27 | 25 | 43 | 75 | 94 |

*comparative

Adhesion Testing: To test for adhesion under high temperature and humidity, coatings were formulated at a 1.6:1 SiH:Vi ratio using vinylsiloxane diluted platinum (Pt) (catalyst), bis (2-methoxy-1-methylethyl) maleate (inhibitor), a polymer chosen from either a dimethylvinylsiloxy end-blocked polydimethylsiloxane (PDMS) polymer with an average degree of polymerization of 130 (P-1) or a vinyldimethylsiloxy endblocked poly(dimethylsiloxane-silicate) copolymer having an average Dp of about 160 (P-2), and either the organohydrogensilicon compound prepared via Example 18 or a comparative crosslinker (C-2) a trimethylsiloxy end-blocked poly(methylhydrogen) siloxane polymer having a total average degree of polymerization of about 20. The formulations were prepared by mixing the appropriate polymer, SiH containing material and inhibitor in a jar and then adding the platinum catalyst with mixing to form each coating formulation. The coatings were then coated onto paper at a thickness of approximately 1.5 microns, and cured on a moving web to less than 5 percent extractable silicone. The cured coatings were then laminated with an acrylic emulsion adhesive and aged in a climate-controlled chamber that was maintained at 150 degrees F. and 85 percent relative humidity. The adhesion of the release coating to the substrate was periodically measured by a finger rub-off test. A designation of "Y" was assigned if rub-off was observed, indicating poor adhesion, and a designation of "N" was assigned if no rub-off was observed, indicating good adhesion. See Table 3 for the results.

TABLE 3

Adhesion of Coatings to Substrate
After High Temperature and Humidity Aging

| | | | | Finger Rub-off (Y/N) Period of Aging (Days): | | |
|---|---|---|---|---|---|---|
| Polymer | Crosslinker | Pt Level | Substrate | 0 | 1 | 7 |
| P-1 | Example 18 | 20 | Glassine | N | N | N |
| P-1 | C-2* | 100 | Glassine | N | N | Y |
| P-2 | Example 18 | 20 | Glassine | N | N | N |
| P-2 | C-2* | 20 | Glassine | N | Y | |

*comparative

The invention claimed is:

1. A composition comprising (A) at least one compound having at least one aliphatic unsaturation; (B) at least one organohydrogensilicon compound containing at least one silicon-bonded hydrogen atom per molecule described by formula (III)

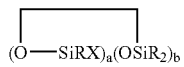

where each R is independently selected from a hydrogen atom and a monovalent hydrocarbon group comprising 1 to 20 carbon atoms which is free from aliphatic unsaturation, a is an integer from 1 to 18, b is an integer from 1 to 19, a+b is an integer from 3 to 20, each X is an independently selected functional group selected from a halogen atom, an ether group, an alkoxy group, an alkoxyether group, an acyl group, an epoxy group, an amino group, or a silyl group, or a -Z-$R^4$ group, where each Z is independently selected from an oxygen and a divalent hydrocarbon group comprising 2 to 20 carbon atoms, each $R^4$ group is independently selected from —$BR_uY_{2-u}$, or a group described by formula (IV):

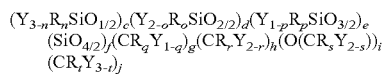

where B refers to boron, each R is as described above, the sum of c+d+e+f+g+h+i+j is at least 2, n is an integer from 0 to 3, o is an integer from 0 to 2, p is an integer from 0 to 1, q is an integer from 0 to 1, r is an integer from 0 to 2, s is an integer from 0 to 2, t is an integer from 0 to 3, u is an integer from 0 to 2, each Y is an independently selected functional group selected from a halogen atom, an ether group, an alkoxy group, an alkoxyether group, an acyl group, an epoxy group, an amino group, or a silyl group, or a Z-G group, where Z is as described above, each G is a cyclosiloxane described by formula (V):

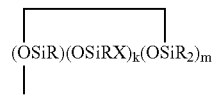

where R and X are as described above, k is an integer from 0 to 18, m is an integer from 0 to 18, k+m is an integer from 2 to 20, provided in formula (IV) that one of the Y groups is replaced by the Z group bonding the $R^4$ group to the cyclosiloxane of formula (III), and provided further at least one X group of formula (III) is a -Z-$R^4$ group, if g+h+f+i+j>0 then c+d+e+f>0 and if Z is a divalent hydrocarbon group, a=1, c=2, e+f+g+h+i+j=0 and d>0, then at least one d unit (ie. $Y_{2-o}R_oSiO_{2/2}$) contain a -Z-G group or the c units (ie. $Y_{3-n}R_nSiO_{1/2}$) have no -Z-G group or at least two -Z-G groups; and (C) a platinum group metal-containing catalyst.

2. The composition of claim 1 where subscript b is an integer from 2 to 19, subscript c is an integer from 0 to 50, subscript d is an integer from 0 to 5000, subscript e is an integer from 0 to 48, subscript f is an integer from 0 to 24, subscript g is an integer from 0 to 50, subscript h is an integer from 0 to 50, subscript i is an integer from 0 to 50, and subscript j is an integer from 0 to 50.

3. The composition of claim 1 where subscript c is an integer from 2 to 15, subscript d is an integer from 0 to 1000, subscript e is an integer from 0 to 13, subscript f is an integer from 0 to 6, subscript g is an integer from 0 to 20, subscript h is an integer from 0 to 20, subscript i is an integer from 0 to 20, subscript j is an integer from 0 to 15.

4. The composition of claim 1 where each R group is independently selected from hydrogen atoms, alkyl groups comprising 1 to 8 carbon atoms, or aryl groups comprising 6 to 9 carbon atoms, each X is a Z-$R^4$ group or is independently selected from chloro, methoxy, isopropoxy, and groups derived by hydrosilylation of the alkenyl group from hydroxybutylvinyl ether, vinylcyclohexylepoxide, and allylglycidylether with an SiH from the siloxane precursor to formulas (III) or (V), where Z is a divalent hydrocarbon group, and $R^4$ is selected from —$R_2SiO(R_2SiO)_dSiR_2$-Z-G, —$R_2SiOSiR_3$, —$R_2SiOSiR_2$—Y, —$RSi(OSiR_3)_2$, where d is an integer from 1 to 50 and Z, G, and R are as described above.

5. The composition of claim 1 where each R group is independently selected from hydrogen, methyl, alpha-methylstyryl, 3,3,3-trifluoropropyl and nonafluorobutylethyl.

6. The composition of claim 1 where R is methyl, and d is an average of 8.

7. The composition of claim 1 where component (B) is described by the structure below where Me is methyl, d is an average of 8, and x is an integer from 1 to 15.

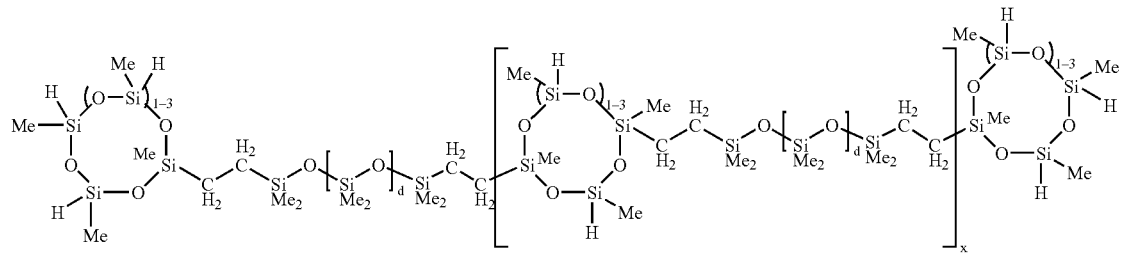

8. The composition of claim 1 where such organohydrogensilicon compounds contain at least 2 silicon-bonded hydrogen atoms per molecule.

9. The composition of claim 1 where such organohydrogensilicon compounds contain at least 3 silicon-bonded hydrogen atoms per molecule.

10. The composition of claim 1 where such compounds have a viscosity from 5 to 50,000 mPa·s.

11. The composition of claim 1 where component (A) is selected from trimethylsiloxy-terminated polydimethylsiloxane-polymethylvinylsiloxane copolymers, vinyldimethylsiloxy-terminated polydimethylsiloxane-polymethylvinylsiloxane copolymers, trimethylsiloxy-terminated polydimethylsiloxane-polymethylhexenylsiloxane copolymers, hexenyldimethylsiloxy-terminated polydimethylsiloxane-polymethylhexenylsiloxane copolymers, vinyldimethylsiloxy-terminated polydimethylsiloxane-polymethyhexenylsiloxane copolymers, trimethylsiloxy-terminated polymethylvinylsiloxane polymers, trimethylsiloxy-terminated polymethylhexenylsiloxane polymers, vinyldimethylsiloxy-terminated polydimethylsiloxane polymers, and hexenyldimethylsiloxy-terminated polydimethylsiloxane polymers, vinyldimethylsiloxy terminated poly(dimethylsiloxane-monomethylsilsesquioxane) polymers, vinyldimethylsiloxy terminated poly(dimethylsiloxane-vinylmethylsiloxane-methylsilsesquioxane) copolymers; trimethylsiloxy terminated poly(dimethylsiloxane-vinylmethylsiloxane-methylsilsesquioxane) polymers, hexenyldimethylsiloxy terminated poly(dimethylsiloxane-monomethylsilsesquioxane) polymers, hexenyldimethylsiloxy terminated poly(dimethylsiloxane-hexenylmethylsiloxane-methylsilsesquioxane) copolymers; trimethylsiloxy terminated poly(dimethylsiloxane-hexenylmethylsiloxane-methylsilsesquioxane) polymers, vinyldimethylsiloxy terminated poly(dimethylsiloxane-silicate) copolymers, hexenyldimethylsiloxy-terminated poly(dimethylsiloxane-silicate) copolymers, trimethylsiloxy terminated poly(dimethylsiloxane-vinylmethylsiloxane-silicate) copolymers and trimethylsiloxy terminated poly(dimethylsiloxane-hexenylmethylsiloxane-silicate) copolymers, vinylsiloxy or hexenylsiloxy terminated poly(dimethylsiloxane-hydrocarbyl copolymers), vinylsiloxy terminated or hexenylsiloxy terminated poly(dimethylsiloxane-polyoxyalkylene) block copolymers, alkenyloxydimethylsiloxy terminated polyisobutylene and alkenyloxydimethylsiloxy terminated polydimethylsiloxane-polyisobutylene block copolymers.

12. The composition of claim 1 further comprising (D) an inhibitor.

13. The composition of claim 1 further comprising (E) a bath life extender.

14. The composition of claim 1 further comprising (F) a release additive.

15. The composition of claim 1 where component (A) comprises at least one compound having at least two aliphatic unsaturations.

16. A method of making a cured coating comprising the steps of (I) mixing: (A) at least one compound having at least two aliphatic unsaturations of claim 15; (B) at least one organohydrogensilicon compound containing at least three silicon-bonded hydrogen atom per molecule of claim 13 and (C) a platinum group metal-containing catalyst which is present in an amount sufficient to catalyze the reaction; (II) coating the mixture from (I) on the surface of a substrate; and (III) exposing the coating and the substrate to an energy source selected from (i) heat and (ii) actinic radiation in an amount sufficient to cure the coating.

17. The method of claim 16 further comprising (IV) applying a pressure sensitive adhesive on the coating after step (III).

18. The cured coating prepared by the method of claim 16.

19. The cured coating prepared by the method of claim 17.

20. The composition of claim 1 where component (B) is selected from the structures below where Me is methyl, $d^1+d^2=d$, and x can range from 1 to 100:

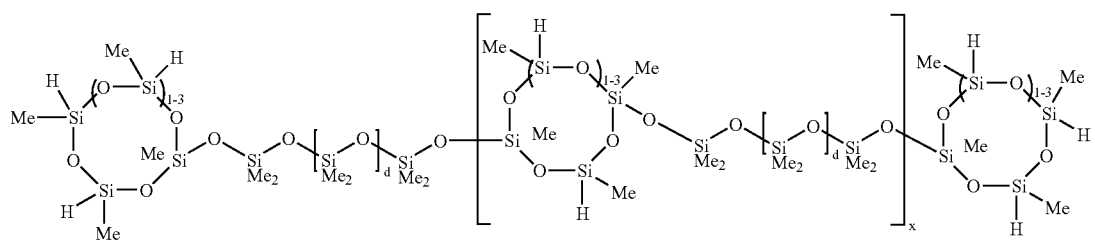

-continued
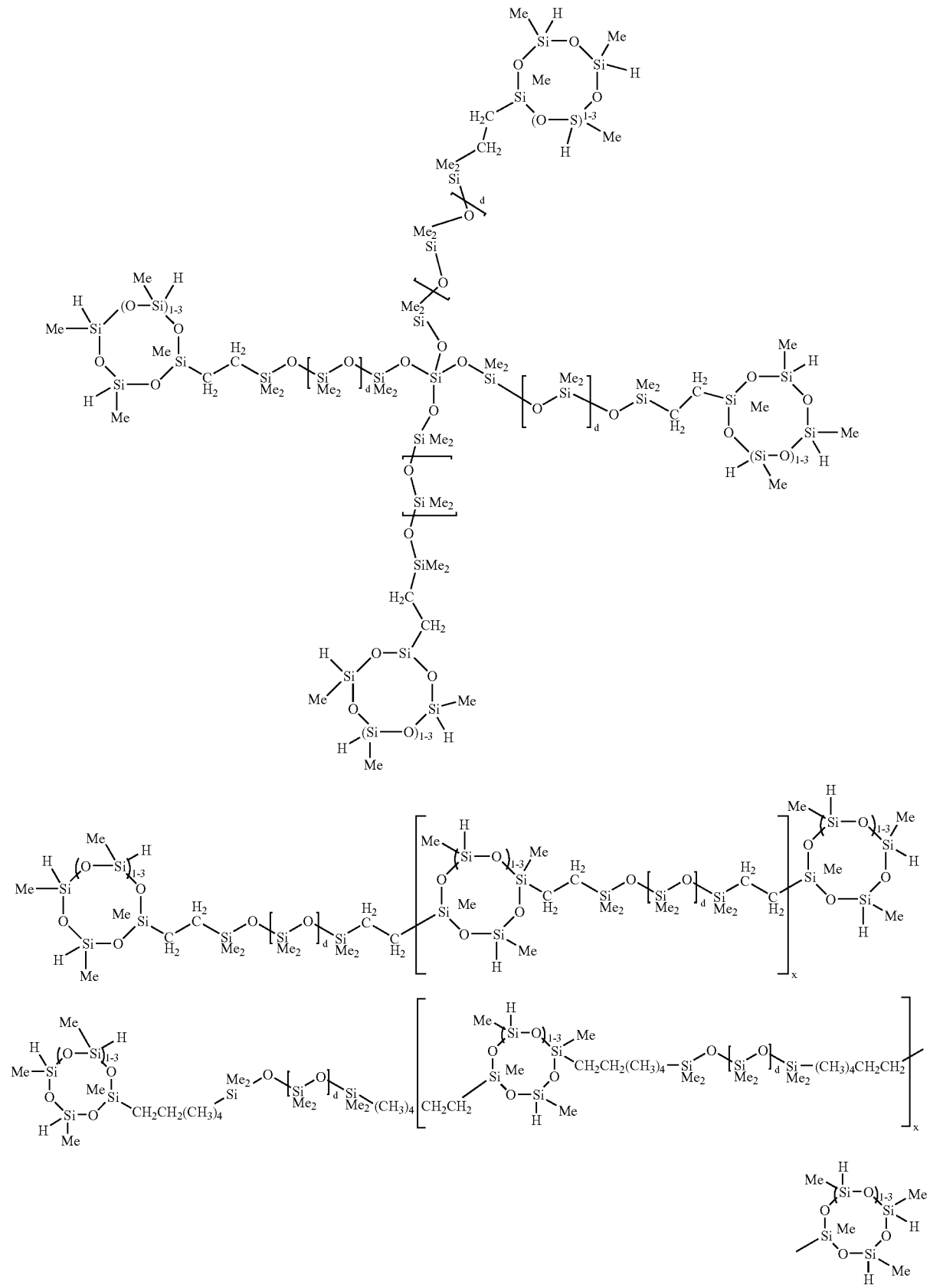

-continued
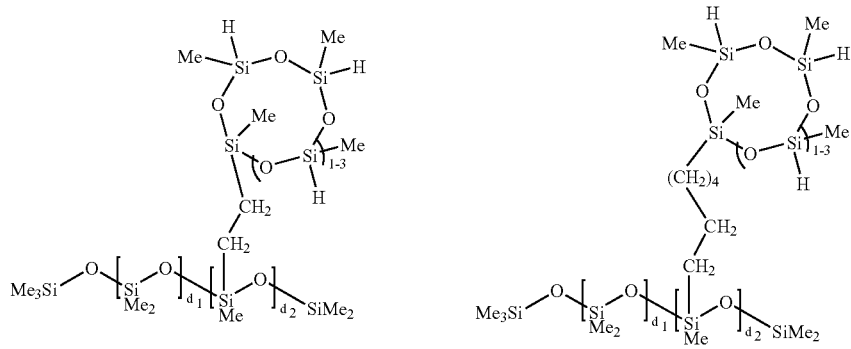
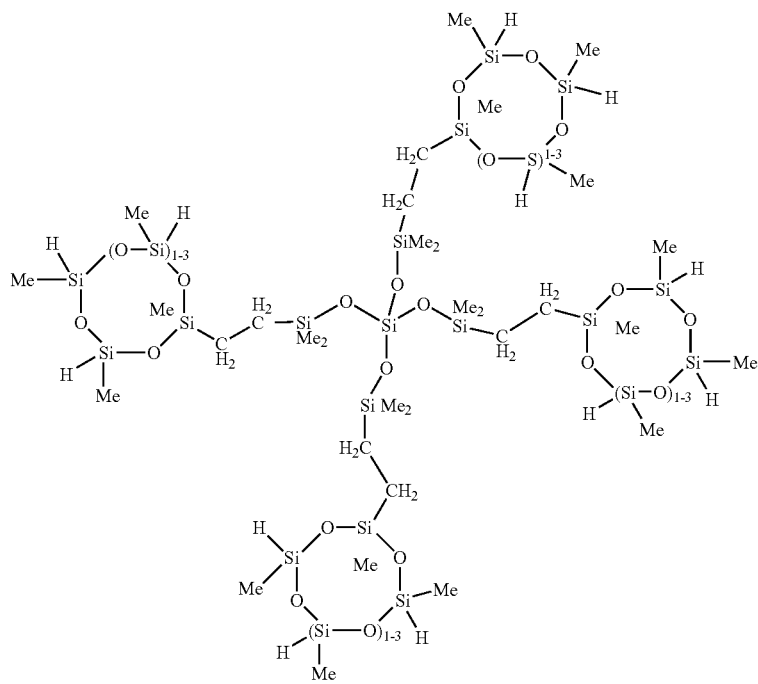
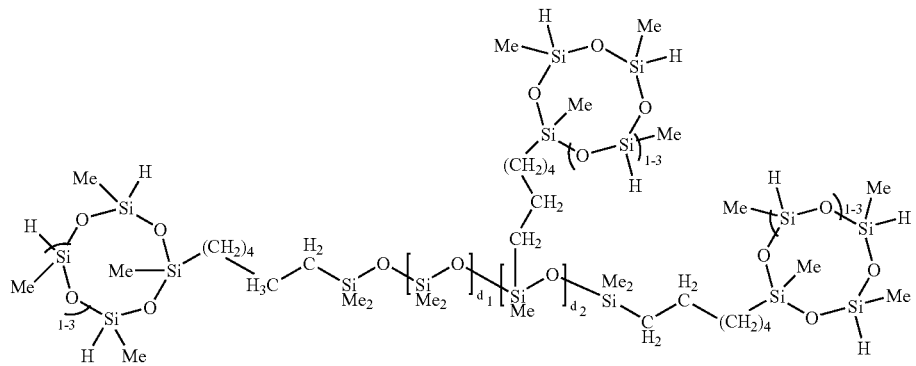

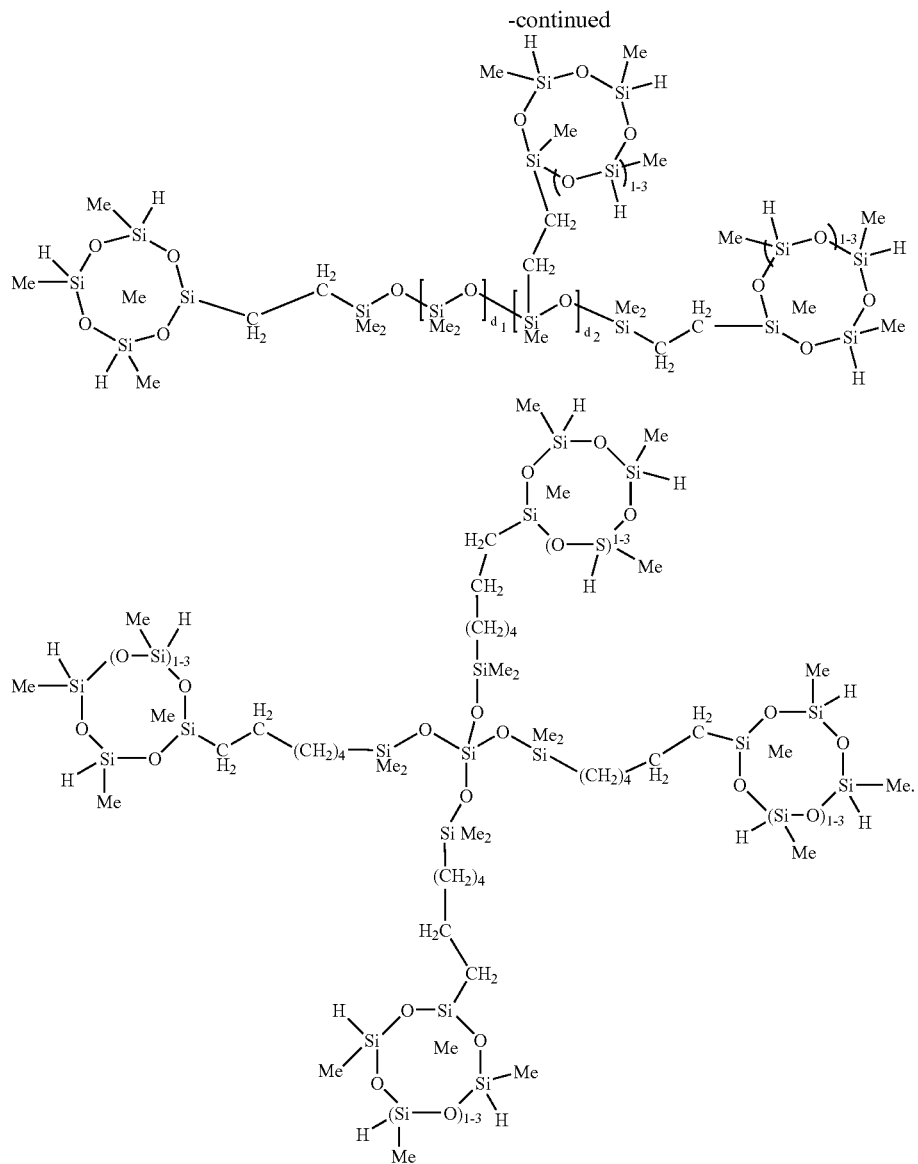

21. The composition of claim 20 or where component (B) is described by such structures where 5 to 70 percent of the SiH bonds are replaced by hydrocarbon, oxyhydrocarbon or functional groups.

22. The composition of claim 20 where component (B) is described by such structures where 5 to 50 percent of the SiH bonds are replaced by functional groups derived by hydrosilylation of allylglycidyl ether (propylglycidyl ether groups) or vinylcyclohexylepoxide, alkyl groups or alkenyl groups.

23. The composition of claim 20 where component (B) is described by such structures where 10 to 30 percent of the SiH bonds are replaced by functional groups derived by hydrosilylation of allylglycidyl ether (propylglycidyl ether groups).

* * * * *